United States Patent
Pai et al.

(10) Patent No.: US 12,493,316 B2
(45) Date of Patent: Dec. 9, 2025

(54) PHOTONIC BLOCKCHAIN BASED ON OPTICAL PROOF-OF-WORK

(71) Applicants: The Board of Trustees of the Leland Stanford Junior University, Stanford, CA (US); PoWx inc., Somerville, MA (US)

(72) Inventors: Sunil K. Pai, San Jose, CA (US); David A. B. Miller, Stanford, CA (US); Olav Solgaard, Stanford, CA (US); Shanhui Fan, Stanford, CA (US); Michael Dubrovsky, Somerville, MA (US); Bogdan Penkovsky, Strassbourg (FR); Maynard Marshall Ball, Jr., New York, NY (US)

(73) Assignees: The Board of Trustees of the Leland Stanford Junior University, Stanford, CA (US); PoWx inc., Somerville, MA (US)

(*) Notice: Subject to any disclaimer, the term of this patent is extended or adjusted under 35 U.S.C. 154(b) by 458 days.

(21) Appl. No.: 18/126,436

(22) Filed: Mar. 25, 2023

(65) Prior Publication Data
US 2024/0004417 A1     Jan. 4, 2024

Related U.S. Application Data

(60) Provisional application No. 63/323,727, filed on Mar. 25, 2022.

(51) Int. Cl.
| | |
|---|---|
| G06E 1/04 | (2006.01) |
| G02F 3/02 | (2006.01) |
| G06Q 20/38 | (2012.01) |

(52) U.S. Cl.
CPC .............. *G06E 1/045* (2013.01); *G02F 3/02* (2013.01); *G06Q 20/3827* (2013.01)

(58) Field of Classification Search
CPC .......... G06E 1/045; G06E 3/008; G02F 3/02; G06Q 20/3827; G06N 3/084; H04L 2209/56; H04L 9/3239; H04L 9/50
See application file for complete search history.

(56) References Cited

U.S. PATENT DOCUMENTS

| | | | | |
|---|---|---|---|---|
| 4,809,204 | A * | 2/1989 | Dagenais | ................ G06E 1/045 359/107 |
| 2021/0382515 | A1 * | 12/2021 | Dubrovsky | ............. G06E 3/008 |

OTHER PUBLICATIONS

Dubrovsky et al., Towards Optical Proof of Work, in Cryptoeconomic Systems (2020).

(Continued)

*Primary Examiner* — Jalatee Worjloh

(57) ABSTRACT

An apparatus for combined digital and optical processing of a cryptocurrency data block includes a digital processor that computes a hash vector from the cryptocurrency data block; a laser and splitter that produces optical input signals; optical modulators that binary phase-shift key modulate the optical input signals based on the hash vector; a photonic matrix multiplier circuit that performs an optically perform a discrete matrix-vector product operation on the modulated optical input signals to produce optical output signals, where the discrete matrix-vector product operation is defined by matrix elements limited to K discrete values, where 2≤K≤17; and photodetectors and comparators that perform optoelectronic conversions of the optical output signals to produce corresponding digital electronic output signals. The digital processor performs a second hash computation on an XOR result between the digital electronic output signals and the hash vector to produce a proof of work result.

8 Claims, 17 Drawing Sheets

(56) References Cited

OTHER PUBLICATIONS

Dubrovsky et al, Optical Proof of Work, arXiv:1911.05193v2 [cs.CR] Feb. 2, 2020.
Pai, et al. (2019). Parallel fault-tolerant programming of an arbitrary feedforward photonic network. arXiv:1909.06179v1 [cs.ET] Sep. 11, 2019.
Sunil Pai, et al. "Matrix Optimization on Universal Unitary Photonic Devices," Physical Review Applied 11, 064044 (2019).
David A. B. Miller, "Perfect optics with imperfect components," Optica 2, 747 (2015).

* cited by examiner

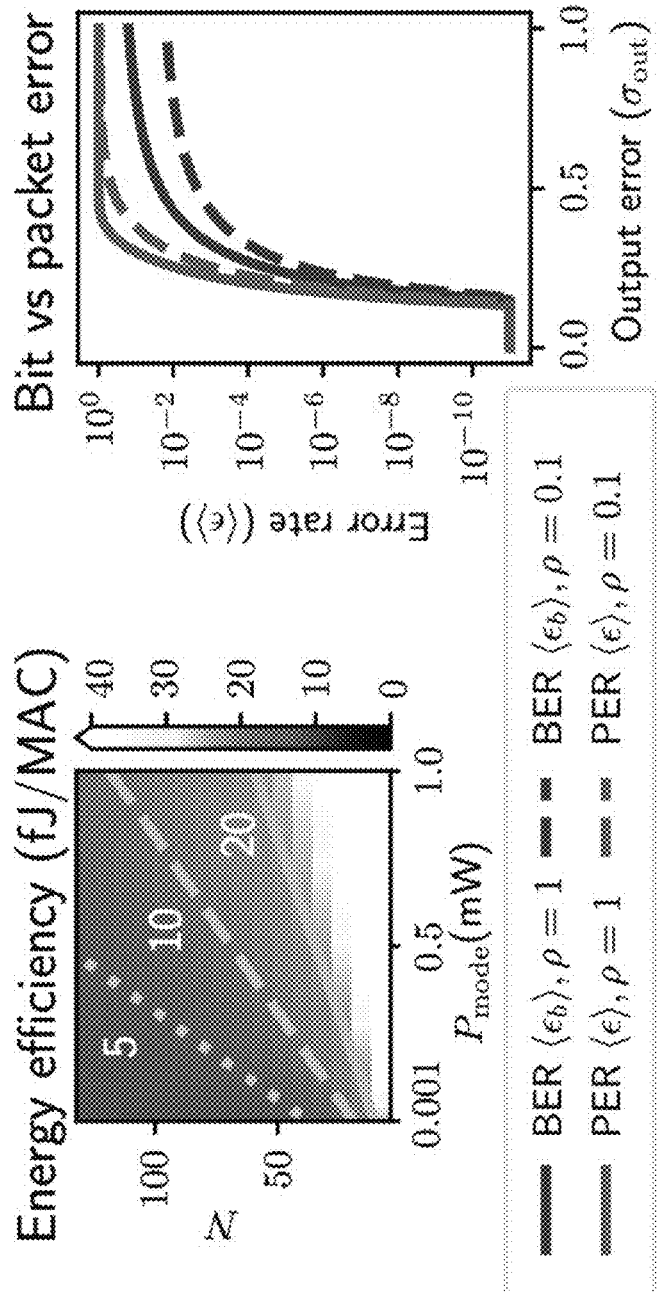
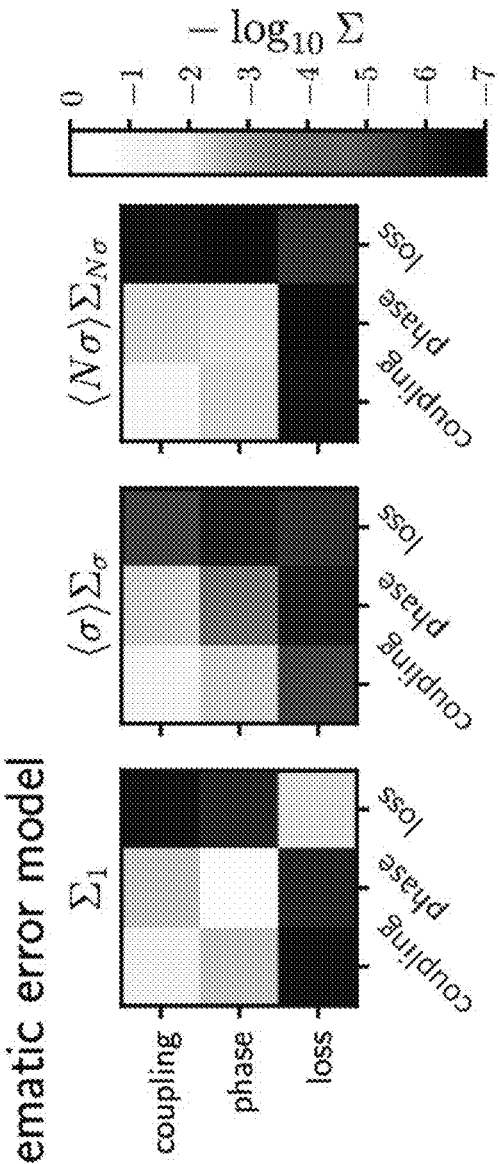
Fig. 2B
Fig. 2C
Fig. 2D

PHOTONIC BLOCKCHAIN BASED ON OPTICAL PROOF-OF-WORK

CROSS-REFERENCE TO RELATED APPLICATIONS

This application claims priority from U.S. Provisional Patent Application 63/323,727 filed Mar. 25, 2022, which is incorporated herein by reference.

STATEMENT REGARDING FEDERALLY SPONSORED RESEARCH OR DEVELOPMENT

This invention was made with Government support under contract FA9550-18-1-0186 and FA9550-17-1-0002 awarded by the Air Force Office of Scientific Research. The Government has certain rights in the invention.

FIELD OF THE INVENTION

The present invention relates generally to optical data processing. More specifically, it relates to techniques for combined digital and optical processing of a cryptocurrency data blocks.

BACKGROUND OF THE INVENTION

Photonic integrated circuits consisting of networks or "meshes" of Mach-Zehnder interferometers (MZIs) are typically proposed as time- and energy-efficient matrix multiplication accelerators for analog domain applications such as quantum computing, sensing, telecommunications, and machine learning. Since photonic meshes can be designed and mass-produced using well-established silicon foundry processes, there has recently been increased effort to commercialize the technology for analog domains that do not necessarily require high accuracy for high performance (e.g., machine learning). These existing photonic meshes in the continuous analog domains of sensing and quantum computing, however, are subject to errors and are not yet sufficiently robust and accurate to permit applications to discrete digital domains, such as cryptography and blockchain technology.

BRIEF SUMMARY OF THE INVENTION

As blockchain technology and cryptocurrency become increasingly mainstream, photonic computing has emerged as an efficient hardware platform that limits ever-increasing energy costs required to verify transactions in decentralized cryptonetworks. To reduce sensitivity of these verifications to photonic hardware error, we propose and experimentally demonstrate a cryptographic scheme, LightHash, that implements robust, low-bit precision matrix multiplication in programmable silicon photonic networks. We demonstrate an error mitigation scheme to reduce error by averaging computation across circuits, and simulate energy efficiency-error tradeoffs for large circuit sizes. We conclude our error-resistant and efficient hardware solution can potentially generate a new market for decentralized photonic blockchain.

Error correction and high-fidelity operation of optical proof of work systems are critical to enable photonics-accelerated blockchain applications. Existing optical proof of work systems suffer from systematic error, which can increase the hash error rate and limit functionality of photonics-accelerated blockchain applications. Herein is disclosed combined optical and digital processing apparatus and method, including a new error resistant hash function ("LightHash") and error-correction protocols to address this concern.

Advantages and improvements over existing methods include the following:
Efficient optoelectronic conversions using comparators and modulator switches
Hardware agnostic error correction protocol/architecture to correct systematic error in photonic matrix multiplies
A matrix multiply with discrete output values to minimize the systematic (non-random) error problem
An algorithm that readily achieves "photonic consensus" or multiple photonic chips "agreeing" on the same result
Outputs single bit per waveguide port for energy and time efficiency (HeavyHash, a previous photonic crypto proposal, outputs multiple bits: this is potentially less energy-efficient.)

LightHash provides a new cryptographic hash function and an ideal photonic hardware accelerator capable of arbitrary linear optical matrix multiplies of circuit size N (N×N matrix Q multiplied by N-dimensional vector x) to solve the optical proof of work error problem. A key insight of the method is that the matrix operation implemented by the photonic hardware is implemented in a discrete space with limited space of possible outcomes (low enough bit resolution) to ensure that the error rate is near zero.

The algorithm is an adaptation of HashCash (the scheme used in Bitcoin's proof of work protocol), with the modification that in between the two successive SHA3-256 hashes, the LightHash protocol implements an energy efficient matrix-vector product in the analog domain. This is described below and in the attached documentation (including full pseudocode for the photonic LightHash block creation):

Input: The input into the photonic network is a phase-shift keyed bitstream $b_{in}$ which is represented as inputs of equal magnitude set to either $x_n = \{1, -1\}$ depending on a bit value $b_n = \{0, 1\}$ so, a vector of inputs $x = e^{i\pi b_{in}}/\sqrt{N}$; this can be set by sending digital signals to well-calibrated optical modulators applying $\pi$ phase shifts for bits equal to 0, and 0 phase shifts for bits equal to 1.

Device operator: The device operator implements some matrix $Q = U\Sigma V^\dagger$ with circuit size N and is composed of two unitary operators U, V of size N, implemented on programmable "universal" triangular or rectangular networks and a set of N singular values $\Sigma$, implemented using MZI node attenuators (with "drop ports"). The elements $Q_{ij}$ are randomly sampled to be one of K distinct integers that are centered at 0 spaced 2 apart. At block creation only, a digital computer is used to find the static phase shifts for meshes implementing U, V, $\Sigma$ to ultimately program Q onto the chip. All calibrations and fine-tuning to correct for error is also performed at this step.

Output: The output of the device is the complex output vector $y = Qx$ with output power $p = |y|^2$, where $|\cdot|^2$ is an element-wise absolute value-squared operation. A photodetector equipped with a transimpedance element (load resistor or amplifier) converts power to voltage, which is then fed through output comparators corresponding to threshold power $p_{th} = y_{th}^2$ to determine output bits (if the output is greater than the threshold value). At block creation, selection of $p_{th}$ via simulation guarantees roughly equal probability of a 0 or 1 bit.

The input and output bits are represented in the digital domain within an integrated SHA256 accelerator (similar to Bitmain's Antminer ASICs) with a co-packaged photonic mesh implementing the optical computation. The SHA accelerator converts transaction data into a 256 bit integer. Overall, the resulting 256 bits are sent through the matrix Q given N<256, so bits are sent into 256/N circuit copies of Q to get the final result. The original input bits are XOR'd with the output bits and then fed into a second SHA3-256 hash. The rest of the protocol follows that of Bitcoin.

To correct any systematic error based on fabrication error in the photonic circuit, we use a simple form of "hardware-agnostic error correction" in which the computation is repeated up to R times across R circuit copies. If the expected error is $\sigma_{out}$, this can reduce the error to $\sigma_{out}/\sqrt{R}$, a factor of $\sqrt{R}$ improvement. This repetition may be implemented using R separate devices implemented on the same chip. To save on energy consumption, we can use the same number of modulators and split the input signal x across R different meshes implementing the same Q but different fabrication error, in a process called "hardware agnostic error correction" as each mesh samples a presumably random systematic error. One way to ensure uncorrelated error is to permute the singular values for the different copies of Q (and appropriate basis vectors of $U, V^\dagger$). The number of comparators should also stay the same assuming the photocurrents from corresponding photodetectors at the R device operator outputs can be grouped into a single current, and then passed through a transimpedance amplifier and comparator.

Commercial applications of the method include the following:
- Decentralized blockchain applications
- Photonic cryptocurrency mining
- Photonic cryptography hardware solutions
- Photonic proof of work based spam filters
- Photonic proof of work based DDoS attack protection
  Digitally verifiable photonic computation
- Photonic hardware consensus mechanism error-corrected photonic systems A prototype implementation demonstrates that a photonic chip can accurately implement a photonic matrix multiply for circuit size N=4 and numerical resolution up to K=9 (with error correction). A much larger prototype implementing LightHash would provide higher scalability.

The LightHash protocol may be incorporated into a photonic cryptocurrency ecosystem (similar to Optical Bitcoin using HeavyHash).

LightHash may be realized on much larger devices (work up in powers of two, i.e., N=8, 16, 32, 64). Co-integration of the photonic chip with digital electronics and a custom SHA-256 accelerator similar to Bitmain's Antminer may be realized.

The accuracy of LightHash may be improved in some implementations using photonic matrix multiplies that incorporate "perfect" double-MZI operation.

In one aspect, the invention provides an apparatus for combined digital and optical processing of a cryptocurrency data block, the apparatus comprising a digital processor configured to perform a first hash computation to produce a hash vector from the cryptocurrency data block; a laser and splitter configured to produce optical input signals; optical modulators configured to binary phase-shift key modulate the optical input signals based on the hash vector to produce modulated optical input signals, wherein each of the modulated optical input signals is limited to a first set of discrete values; a photonic matrix multiplier circuit configured to optically perform a discrete matrix-vector product operation on the modulated optical input signals to produce optical output signals, wherein the discrete matrix-vector product operation is defined by matrix elements, each of which is limited to a set of K discrete values, where $2 \leq K \leq 17$; wherein each of the optical output signals is limited to a second set of discrete values; photodetectors and comparators configured to perform optoelectronic conversions of the optical output signals to produce corresponding digital electronic output signals; wherein the digital processor is also configured to perform a second hash computation on an XOR result between the digital electronic output signals and the hash vector to produce a proof of work result.

Preferably, each of the modulated optical input signals is limited to a set of two discrete values. Preferably, each of the optical output signals is limited to a set of 2K discrete values, where $2 \leq K \leq 17$.

In one implementation, the a discrete matrix-vector product operation has size N, and the apparatus is configured to optically perform the discrete matrix-vector product operation 256/N times to produce the optical output signals, where $1 \leq N \leq 256$.

In one implementation, the photonic network implements a matrix $Q=U\Sigma V^\dagger$ with circuit size N using two unitary operators U, V of size N, and a set of N singular values $\Sigma$, implemented using Mach-Zehnder interferometer node attenuators, where $1 \leq N \leq 256$.

In one implementation, the photonic matrix multiplier circuit is a photonic network of Mach-Zehnder interferometers. In one implementation, the first hash computation is a first SHA3-256 computation and the hash vector is a 256-bit vector; and the second hash computation is a second SHA3-256 computation.

In one implementation, the apparatus further includes R circuit copies of electronic and digital circuits as recited in claim 1, wherein the R circuit copies are configured to repeatedly perform the combined digital and optical processing of the cryptocurrency data block R times to reduce error.

BRIEF DESCRIPTION OF THE SEVERAL VIEWS OF THE DRAWINGS

FIG. 2B is a graph of optical energy efficiency, illustrating an energy scaling relation.

FIG. 2C is a graph of bit error rate vs packet error, showing the effect of error prefactor on the bit error scaling.

FIG. 2D are plots showing the fitted log scale normalized systematic error model.

DETAILED DESCRIPTION OF THE INVENTION

Introduction

Figures 1A, 1B:
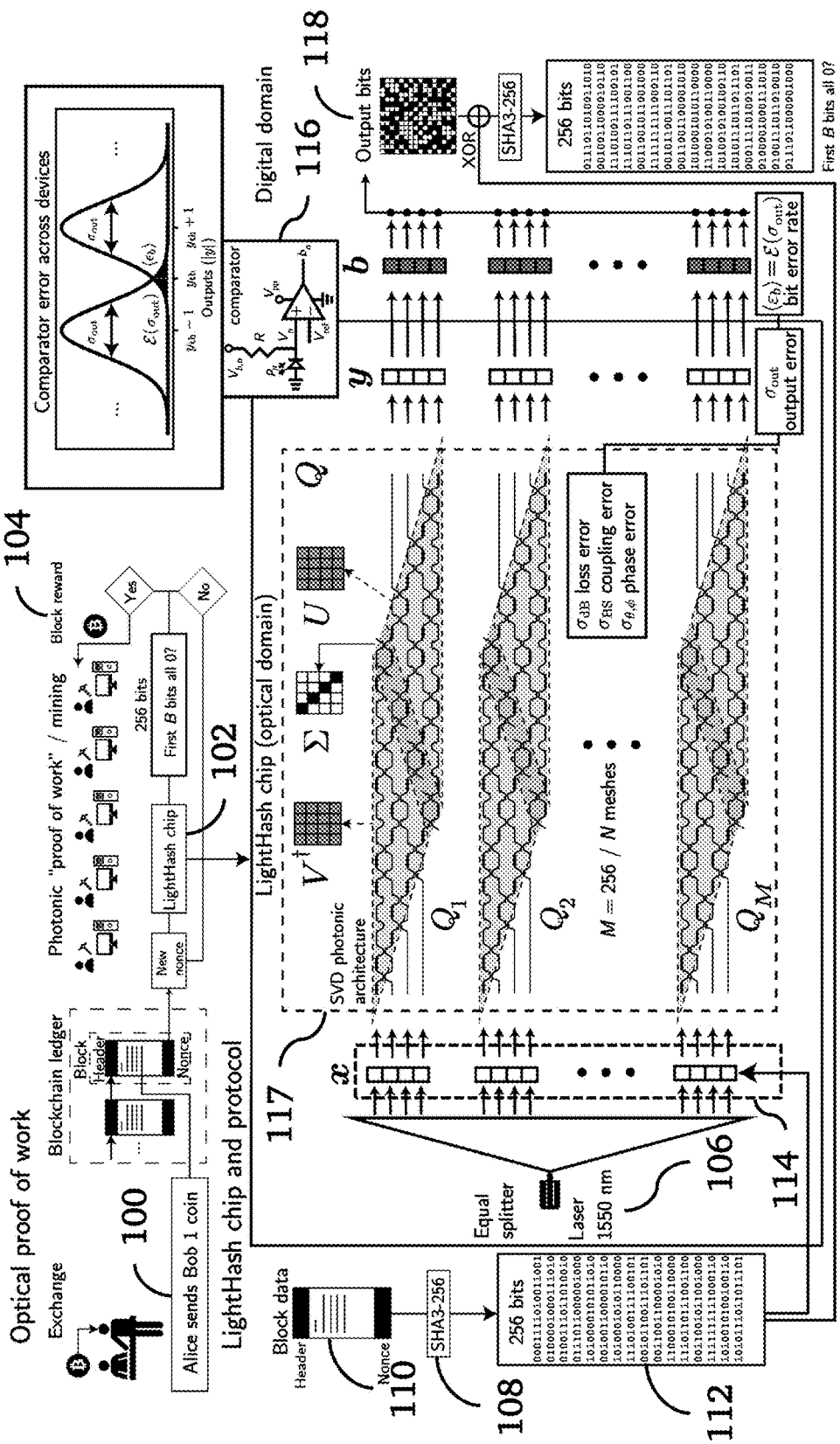
FIG. 1A is a schematic diagram providing an overview of an apparatus and method for optical proof of work, according to an embodiment of the invention.
FIG. 1B is a schematic diagram providing detail of an optical processor shown in FIG. 1A.

Photonic integrated circuits consisting of networks or "meshes" of Mach-Zehnder interferometers (MZIs) are typically proposed as time- and energy-efficient matrix multiplication accelerators for analog domain applications such as quantum computing, sensing, telecommunications, and machine learning. Since photonic meshes can be designed and mass-produced using well-established silicon foundry processes, there has recently been increased effort to commercialize the technology for analog domains that do not necessarily require high accuracy for high performance (e.g., machine learning). Such a computing approach has been previously explored in mixed-signal deep neural network inference designs that favor low-bit resolution up to thermal noise limits. In this work, we implement a similar approach in photonics extending applications of photonic meshes from the continuous analog domains of sensing and quantum computing to discrete digital domains of cryptography and blockchain technology at low bit precision. To that end, we design photonic matrix multiplication hardware under more stringent numerical accuracy requirements requiring "near-perfect" digital computation.

As our core application, we disclose "photonic blockchain" technology which implements "optical proof of work" (oPoW), which is proof that this computational work has been performed in the optical domain. In general, oPoW is designed to favor optical computation over digital alternatives; HeavyHash (the first proposal for oPoW) is currently implemented on two live networks (oBTC and Kaspa) and is under consideration for the popular cryptocurrency Bitcoin as part of Bitcoin Improvement Proposal (BIP) 52.

Transitioning Bitcoin to oPoW would require an update to the Bitcoin codebase which now uses the SHA-256 hash in its proof of work algorithm. Equipped by optical computation with sufficient accuracy, such protocols can leverage energy efficient computation and state-of-the-art photonic hardware (such as photonic meshes) to verify cryptocurrency transactions and ultimately other wide ranging applications of blockchain such as medical data, smart contracts, voting, logistics and tracking, spam filters and protection from distributed denial-of-service (DDoS) attacks. In situations where energy cost is a bottleneck, blockchain technologies that use optical proof of work inherently incentivize using photonic hardware over other alternatives to gain competitive advantages in compute efficiency and further security against malicious actors such as malware or attack vectors. For example, at the time of writing, cryptocurrency mining accounts for as much energy as many countries, and this energy consumption will increase, by design, as more value is stored in decentralized PoW blockchains. Energy cost concerns have contributed to recent crashes in the cryptocurrency marketplace. Photonic blockchain could thus serve as a timely application for a proof of work based cryptocurrency that incentivizes energy-efficient photonic hardware, which can furthermore prove to be an appealing option for other blockchain-based applications.

While our primary emphasis is implementation and performance of oPoW, we must first clarify the energy-efficiency problem in blockchain and cryptocurrency. Cryptocurrency is a decentralized currency market where transactions (e.g., "Alice gives Bob 1 bitcoin") are stored in a chain of blocks ("blockchain"). To earn a share of the market, a cryptocurrency miner can "mine" (add a new block of transactions) to the blockchain using computational "proof of work" (PoW) where the computer can solve a puzzle for a payout reward. This puzzle consists of generating a 256-element bitvector (vector of 1's and 0's) by feeding digital block transaction data through a cryptographic hash function H, such as SHA-256 (which converts any digitally encoded data into 256-bit numbers and which is infeasible to in-vert), which is the energy-intensive "computational work." (Such hash functions, "one-way" (non-invertible) functions for private-key cryptography, are more generally used to securely encrypt and decrypt data for various secure applications beyond blockchain.) This function is called twice (once on the original block data and again on the result of the first call) through a scheme similar to "HashCash" while adjusting a nonce (32-bit pseudorandom number) in the block until the first B bits in the bitvector are 0, which proves that sufficient computational work has been done and adds the block to the blockchain. The parameter B is a tunable difficulty parameter that is increased as the coin (which in many cases has limited supply) is more scarce and the expected number of cycles before the puzzle is solved is $2^B$. Crucially, cryptocurrency mining comes at an energy cost proportional to the number of hash function solves before a block is mined and transactions in the block are verified.

In optical PoW, the miner is incentivized to reduce mining costs by choosing a hash function H such that some choice of optical (photonic) hardware improves the energy efficiency and speed of computation compared to digital alternatives for H. A key idea here is not to choose an H that outperforms an existing hash function e.g., Bitcoin. Rather, we intentionally choose some feasible H for which optical hardware is more energy efficient compared to any digital hardware to evaluate a specific H. The overall goal is to shift overall mining budget of a given cryptocurrency from operating expense (energy) to capital expense (hardware) by incentivizing more complex and costly, but also more energy efficient, hardware. This energy efficiency arises due to limited hardware resource and high capital expense reducing the number of H evaluations required to operate the blockchain. Reduced energy consumption is possible even when computational energy per H evaluation exceeds that of Bitcoin, likely required to ensure the same security guarantee as Bitcoin.

However, the great challenge of such computing is that, for a well designed cryptographic hash, any error in the bits output by analog hardware renders an entire hash verification invalid; this necessitates some strict design criteria and possibly some error mitigation which we explore in this work. We address this accuracy problem by numerically and experimentally evaluating a new photonic hash function called "LightHash," a modified hash function from Bitcoin's Hashcash that combines the energy-efficiency of low-bit precision photonic matrix-vector multiplication with the security assurances of the Bitcoin protocol (i.e., digital hash functions SHA-3 or SHA-256). We define feasible design criteria (e.g., number of photonic inputs and outputs) and propose a hardware agnostic error mitigation scheme that enables our photonic hash function to outperform any digital alternative. Notably, other non-oPoW approaches promise a low-energy blockchain security algorithm (e.g., proof-of-stake); however, they present new unexplored security risks and alter the basic game theory underlying systems like Bitcoin.

Photonic Blockchain

Photonic blockchain can be defined as any blockchain technology incorporating a photonic link and/or computational element aimed at improving the energy efficiency required to add blocks to the blockchain. In optical cryptography, a cryptographer encrypts or decrypts a message by sending the message bits through a hash function, where at least one part of the hash function favors the energy efficiency of optics, which can help shift the market away from centralized corporate entities specializing in digital hardware mining. Here, we propose a class of photonic hash functions ("LightHash") that modifies the Bitcoin scheme and benefits from energy efficient matrix-vector multiplication (MVM) performed optically.

Our LightHash implementation, though by no means the only possible photonic implementation of efficient MVM, is built from N-port triangular or rectangular MZI networks. Meshes operate by repeatedly interfering spatially multiplexed mode vectors of coherent light (over the N ports), where modes are represented as complex numbers with amplitude and phase. The constructive and destructive interference can be programmed using electrically-controlled phase shifts to implement any unitary transmission matrix $U \in U(N)$ (satisfying the energy conserving property $U^\dagger U = I$). After adding a column of "singular value" MZIs followed by a second universal network, it is possible to compute an arbitrary linear operator based on the singular value decomposition (SVD) of any matrix Q. The resulting photonic processors can be programmed to implement arbitrary linear operations in an energy-efficient manner; though energy must be spent in generating, modulating, and detecting the optical signals, the actual matrix-vector product is performed by passive linear optical transformations without additional power. The rest of the computation in photonic hash functions include logical operations on bits that are best implemented in the digital domain (e.g., SHA-256 is efficiently implemented on digital processors) and ultimately provide the necessary provably secure protection. By co-integrating this digital functionality with photonic meshes in a systematic manner, we leverage the unique benefits of optics (linear computation) and electronics (nonlinear computation and logic) for a fully integrated photonic cryptographic solution. While previous proposals of this scheme exist (e.g., HeavyHash), a protocol that is sufficiently error tolerant and is both time- and energy-efficient (including the analog-digital conversion) is yet to be proposed. Similar challenges are faced in photonic circuits for digital optical telecommunications, and indeed, the mathematics of "bit error rates" also can be applied to the problem of optical cryptography. Ultimately, the core challenge is to find a protocol that successfully brings photonic computing, a technology typically used for analog computing, into the digital realm with near perfect accuracy.

To this end, we discovered that meshes can accurately implement matrix multiplication compared to an electronic digital implementation so they can ultimately be used for PoW cryptography and confer a "photonic advantage." The "photonic advantage" for our particular scheme follows from the insight that, within the LightHash evaluation, photonic hardware performs amortized matrix multiplication by a random block-diagonal Q operator at least an order of magnitude more efficiently than traditional hardware, where element within the blocks of Q is sampled from uniform distributions over a set of K integers. First, through numerical simulation, we show that programming a block integer matrix Q onto a series of SVD-based photonic architectures (as opposed to purely unitary circuits) and adjusting the numerical precision through different integer K values can minimize the systematic error in the analog computation to make it more amenable to optical cryptography. Then, we experimentally evaluate the cryptographic protocol on a physical photonic chip accelerator capable of performing 4×4 unitary matrix-vector products to estimate performance on our new proposed LightHash protocol. Since the LightHash matrix-vector operation is performed in discrete space, we can find conditions such that possible outputs are separated sufficiently far enough to guarantee near-perfect accuracy. The increased energy-efficiency-per-compute of a photonic platform would increase the security of cryptocurrencies and blockchain operations and significantly shift from energy cost (operating expense) to resource cost (capital expense) in cryptocurrency mining. The resulting increased demand for photonic chips could incentivize photonic integrated circuit (PIC) development and manufacturing by adding new applications.

Protocol

FIGS. 1A, 1B are schematic diagrams illustrating an apparatus and method for implementing a photonic cryptocurrency protocol using photonic meshes. FIG. 1A shows an overview of the LightHash optical proof of work protocol, which adapts the Bitcoin protocol by inserting an arbitrary photonic mesh-based matrix-vector product. A transaction 100 is verified by photonic miners as in the Bitcoin network, with a photonic chip 102 being a preferred technology to achieve a block reward 104.

FIG. 1B is a schematic view of an optical and electronic chip footprint including a laser 106, a digital processor 108 to accelerate SHA3-256 processing of block data 110 to produce a hash 112, a modulator 114 and comparator 116 for optoelectronic conversions, and optical processors 117 implementing Q using 256/N parallel SVD operations of size N, here depicted for N=4. Output bits 118 are preferably measured using comparators running at GHz speeds. The photonic proof of work error analysis model shows how systematic (loss, coupling, phase) error in the device propagates all the way to an overall hash error rate $\langle\varepsilon\rangle \approx 256\langle\varepsilon_b\rangle$ which arises due to overlap between successive values near the threshold shown in the inset. Reducing the hash error rate is the main aim of this work and is necessary to implement LightHash in practice.

The LightHash photonic cryptographic protocol transforms block (transaction) data into a 256-bit "possible solution" to a cryptographic puzzle, and includes a photonic integrated chip computation within the protocol. The protocol begins with the well-known SHA3-256 protocol, which is part of the already-prevalent digital cryptocurrency Bitcoin and converts block data (containing transactions in the marketplace) into a 256-bit vector containing a sequence of 256 0's and 1's. This bit data is directly fed to optical modulators controlling the optical input into the photonic accelerator chip in chunks of N bits with the following protocol:

1. Input: the input into the photonic network is a phase-shift keyed bitstream $b_{in}$ which is represented as inputs of equal magnitude set to either $x_n = \{1, -1\}$ depending on bit value $b_n = \{0, 1\}$, i.e., $x = e^{i\pi b_{in}}/\sqrt{N}$; this is set by sending digital signals to well-calibrated optical modulators.

2. Device operator: As shown in FIG. 1B for N=4, the device operator for each block $Q_m = U\Sigma V^\dagger$ with circuit size N consists of two unitary operators U, V of size N, implemented using triangular or rectangular networks and a set of N singular values $\Sigma$, implemented using MZI node attenuators (with "drop ports"). The elements $Q_{m,ij}$ are randomly sampled to be one of K distinct integers centered symmetrically around 0 and spaced 2 apart. At block creation only, a digital computer is used to find the static phase shifts for meshes implementing U, V, $\Sigma$ to ultimately program Q onto the chip.

3. Output: The output of the device is the complex output vector y=Qx with output power $p=|y|^2$, where $|\cdot|^2$ is an element-wise absolute value-squared operation. A photodetector equipped with a transimpedance element (load resistor or amplifier) converts power to voltage, which is then fed through output comparators corresponding to threshold power $p_{th} = y_{th}^2$ to determine output bits $b := H(p - p_{th})$ (where H is the Heaviside step function). At block creation, selection of $p_{th}$ via simulation guarantees roughly equal probability of a 0 or 1 output bit.

Note that the definition of the threshold amplitude $|y_{th}|$ should be consistent with the scaling of the blocks in matrix Q. Since the maximum singular value of Q is set to 1 in the physical implementation (no optical gain elements are used in our photonic mesh), the threshold amplitude is also scaled by this factor.

The LightHash function, a relatively simple modification of the Bitcoin protocol, was chosen carefully to allow for a feasible photonic cryptographic protocol. A key insight in LightHash is that spacing possible optical output values in a discrete grid (i.e., using integer math) ultimately enables an error tolerant threshold and "digital verifiability" of the hash function. This digital optical data encoding is required in the blockchain proof of work protocol and may be checked by other digital systems already used throughout the cryptonetwork.

A unique feature of LightHash is the bit resolution K, which can be used to change the range of possible output values. For instance, K=2 means the matrix elements can be either 1 or -1, and K=4 means the options for each matrix element are (-3, -1, 1, 3). Each row vector-vector product in the overall matrix vector product can actually be thought of as a random walk with K defining possible step sizes (1 for K=2 and (1,3) for K=4). Since the inputs are either -1 or 1, an increase in K means an increase in range of possible output values and effectively the number of bits or quantized levels present in the output. Due to a larger required number of output bits, the use of higher K, as with higher N, leads to higher computational efficiency but a more error-prone photonic chip. We center the possible integers in the matrix to zero since LightHash is designed to represent an optical physical random walk in discrete space. We space the integers by 2 instead of 1 to maintain integer step sizes for both odd and even K.

Note that the device is set to implement Q only once per block added to the blockchain, which means that the photonic miner has some time to self-configure itself to implement Q, and block times can generally be several minutes at sufficiently high difficulty. If N<256, we repeat 256/N times (assuming N divides 256) to output a total of 256 bits 118 that is "exclusive or'd" (XOR'd) with the original input vector 112 and fed into the second SHA3-256 function to produce hash 120 as in FIG. 1B.

Systematic error (e.g., loss, coupling and phase errors) can be compensated in various ways using phase shifter calibration in a photonic mesh; for example, self-configuration, in situ training, or off-chip calculation can compensate for phase and coupling errors, but not loss variance errors. Calibration and error mitigation generally occurs at the level of individual "unit cell" nodes or Mach-Zehnder interferometers (MZIs) that can be more straight-forwardly characterized.

To correct this error, we use a simple form of "hardware-agnostic error mitigation" (FIG. 5C) in which the computation is repeated up to R times across R circuit copies. If the expected error is $\sigma_{out}$, this can reduce the error to $\sigma_{out}/\sqrt{R}$, a factor of $\sqrt{R}$ improvement. This repetition may be implemented using R separate devices implemented on the same chip. To save energy, we can use the same number of modulators and split the input signal x across R different meshes implementing the same Q but different error, in a process called "hardware agnostic error mitigation" as each mesh samples a presumably random systematic error. One potential drawback is that the systematic error may be correlated across the R meshes; one way to address this is to permute the singular values (and basis vectors of $U, V^\dagger$). The number of comparators is the same given the photocurrents from corresponding photodetectors at the R device operator outputs can be grouped into a single current, then passed through a transimpedance amplifier and comparator. Note that if a fixed optical budget is used, the $\sqrt{R}$ improvement assumes photodiode error is sufficiently low compared to systematic error.

The challenge of photonic cryptography that we address is to ensure accuracy across all 256 bits (hash or packet error rate, PER) while also affording a significant advantage over equivalent digital hardware in speed and energy efficiency (otherwise there would be less demand for photonic hardware). For simplicity, we may consider all bits to have independent bit error rates (BER) $\varepsilon_b$, so the hash error rate is given by $\varepsilon = 1 - (1-\varepsilon)^{256} \varepsilon_b$. To put this in practical terms, for any given device to have 1% PER, each of the individual bits should have roughly 0.004% BER. This increases the importance of error mitigation in photonic integrated circuits, which is especially challenging in the presence of unbalanced photonic loss. This requires exploring the tradeoffs of increasing circuit size N and difficulty K (which increase the difficulty) over the error. Pseudocode for optical proof of work based on LightHash is described in further detail below.

Scaling Simulations

Figure 2A:
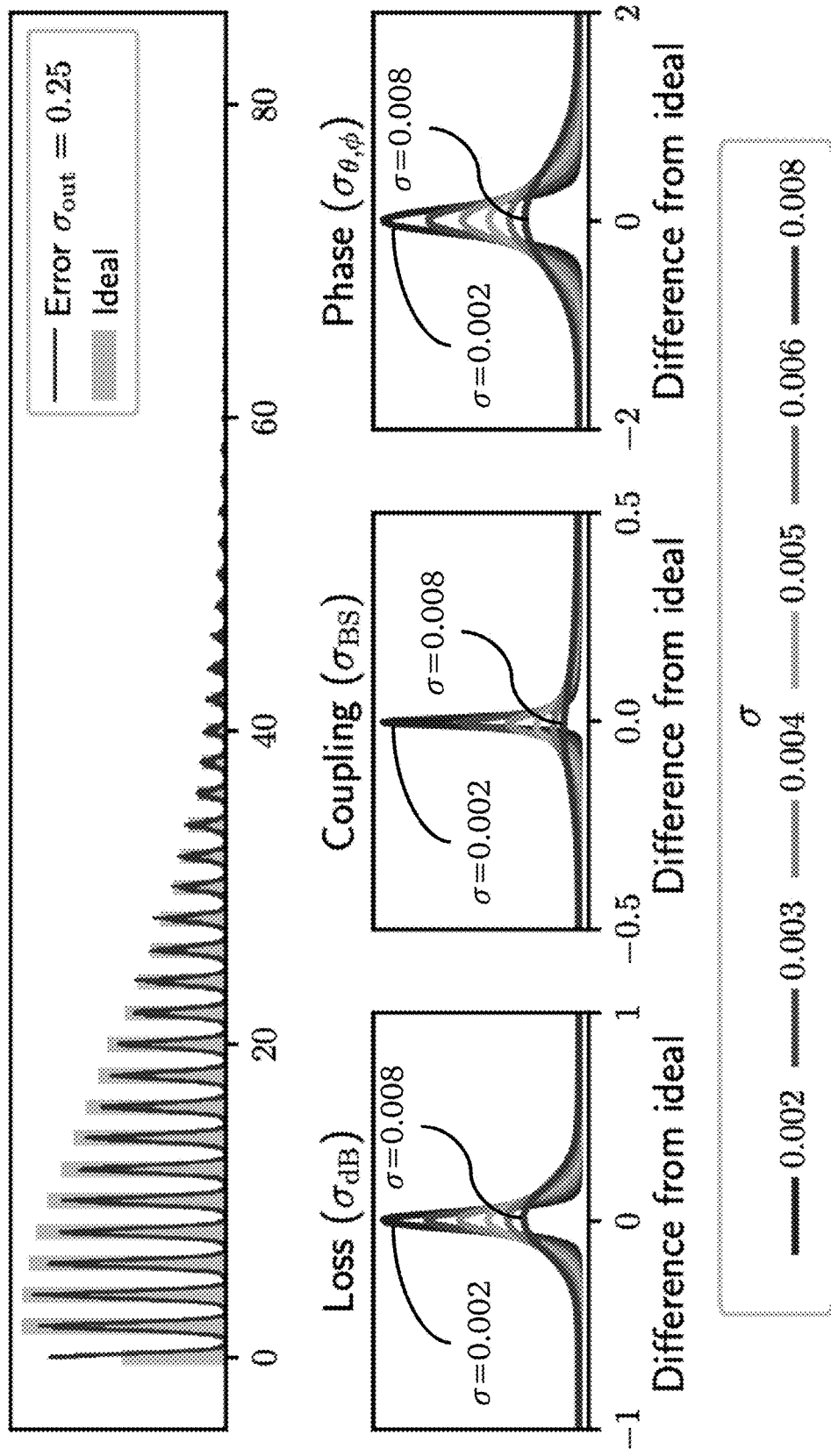
FIG. 2A is a histogram of output error for both ideal and simulated implementations of an embodiment of the invention, including graphs of error distributions.
Figure 2E:
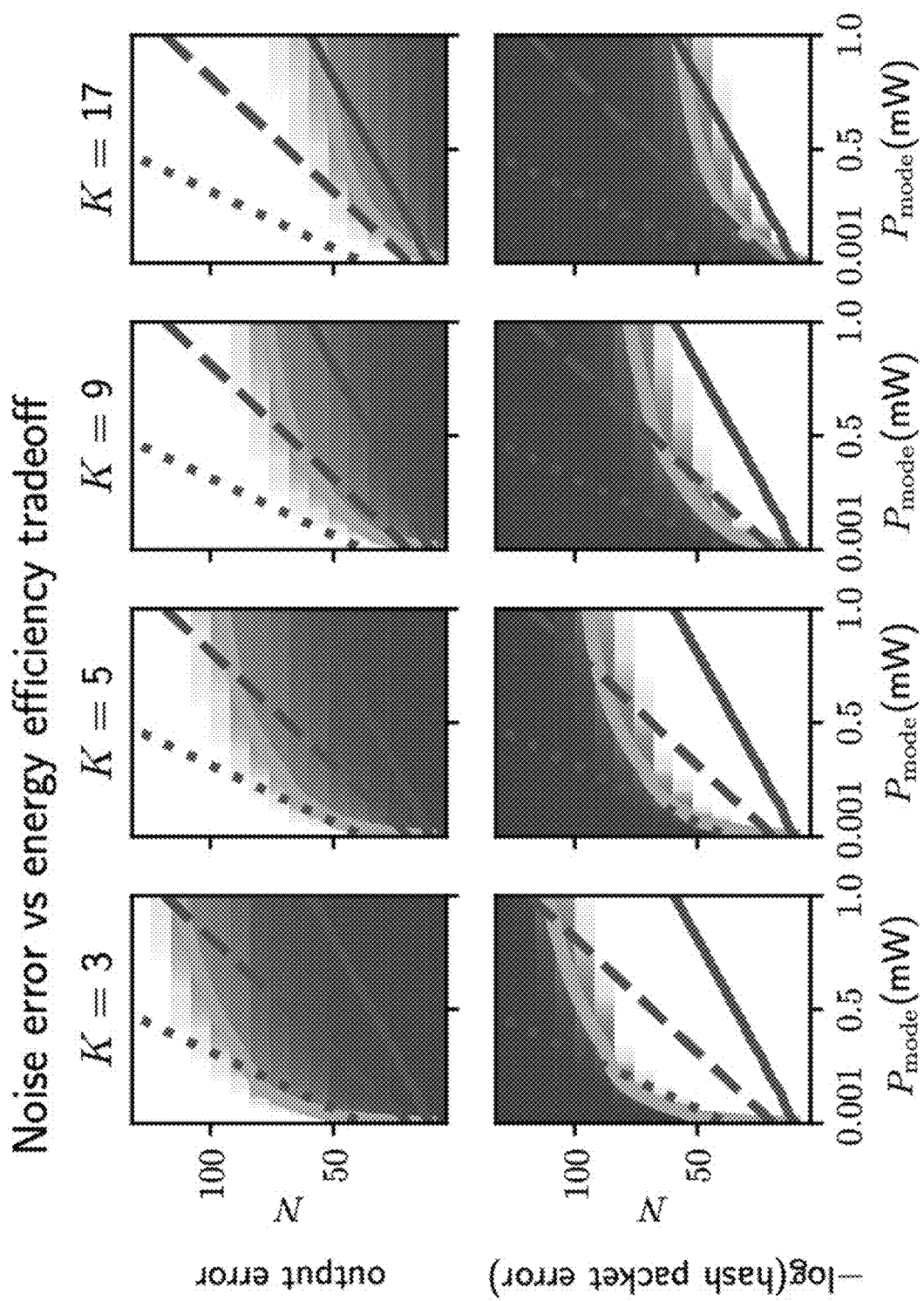
FIG. 2E are graphs showing estimates of the error vs energy tradeoff for various values of design parameters N and K.
Figure 2F:
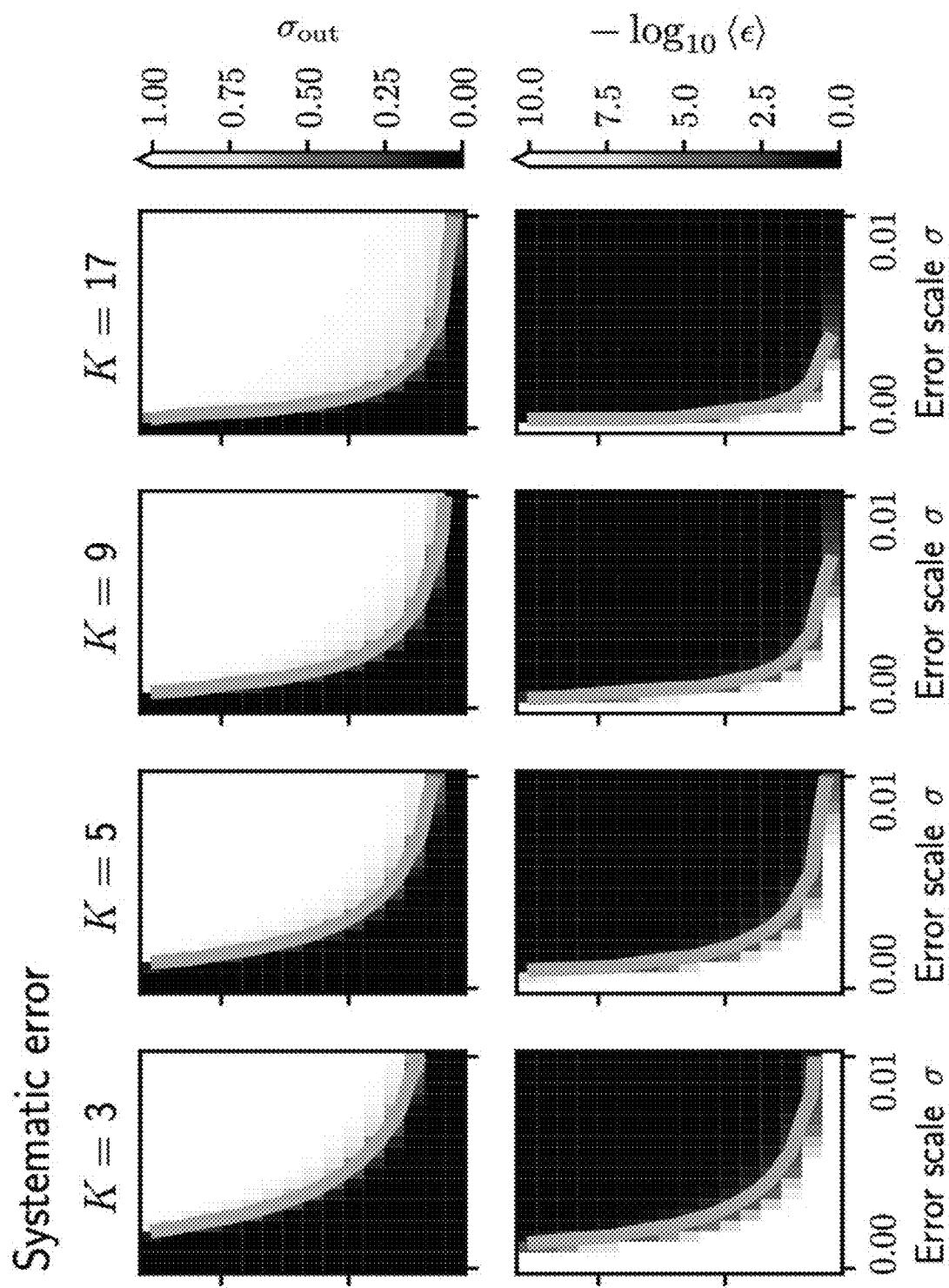
FIG. 2F are graphs of bit threshold error profile for various values of design parameter K.

FIGS. 2A-2F are graphs illustrating results of simulation of LightHash error-energy tradeoff. FIG. 2A is an example output histogram for N=16 and K=8 which exceeds the capabilities of the device for N=4 shown for both ideal and simulated implementations. Overall coupling error, loss error and phase error contributions for error scale σ<0.01 all are roughly Gaussian with coupling errors skewed slightly to the right. FIG. 2B is a graph showing optical energy scaling relation shows that per-mode optical power ($P_{mode}$=1 W to 1 mW) scales with N, with 5, 10, 20 fJ/MAC labelled contours. FIG. 2C is a graph showing the error prefactor ρ has a small effect on the bit error scaling; regardless of the scaling of ρ, we find that $\sigma_{out}$=0.25 is sufficient to ensure sufficiently low bit error (<1%) for ρ=0.1 to 1. FIG. 2D are plots showing the fitted log scale normalized systematic error model (E matrices of Eq. 1), showing high coupling-phase correlation and higher-order contributions to overall output error proportional to σ, Nσ. FIG. 2E are graphs showing estimates, given N from 8 to 128 and K=3, 5, 7, 17 (respectively requiring 2, 3, 4, 5 bits), of the error vs energy tradeoff (see Tables 1-2) overlaying the energy efficiency contours of FIG. 2B, to find the intersection of feasible region and estimated photonic advantage given noise estimates of highly sensitive avalanche photodiodes. FIG. 2F are graphs of bit threshold error profile showing sharp transition in overall hash error as a function of circuit size N and error scale σ=0 to 0.01, sampled over 20 random x, 10 random Q, and 1280/N random error samples scaled by σ and error-weighted by w=[1, 1, 3]. Further simulations show the independent contributions of loss, coupling and phase errors (see FIGS. 4A, 4B, 4C).

First, we numerically evaluate scaling of energy efficiency, noise error, and systematic error where the triangular meshes are replaced by low-depth rectangular meshes using circuit sizes N=8 to 128 for K=3, 5, 9, 17 (smallest K requiring digital representation of 2, 3, 4, 5 digital bits respectively). Ideally, the outputs y follow a roughly discretized Gaussian distribution as might be expected by a random walk based on our definitions of Q and x. The field magnitudes |y| are more readily measured by output photodetectors and as expected form a discrete half-normal distribution as shown in FIG. 2A, with a notable dip in histogram values for outcomes of zero.

In practice, we design LightHash to operate at the limit of the tradeoff between errors (FIG. 2A) and energy efficiency, which depends on input optical power (limitation of shot noise-limited photoreceivers) and systematic fabrication errors giving the problem-scale error $\sigma_{out}$. Assuming the error is sufficiently small for some input optical power $P_{mode}$, we can reasonably achieve energy efficiencies in fJ/MAC (multiply and accumulate), which can outperform digital platforms (FIG. 2B). Compared to digital platforms scaling with MACs ($N^2$ per matrix multiply), the photonic mesh energy consumption scales with N input/output ports.

Given these errors, FIG. 2C indicates that the transition between feasibility and infeasibility occurs sharply when $\sigma_{out}$≈0.25. Bit errors arise due to "bit threshold overlap" in the (approximately) Gaussian error distributions between successive values at threshold, given by $\varepsilon(Q_{out})$=0.5erfc$((\sigma_{out}\sqrt{2})^{-1})$, where erfc denotes the complementary error function. The quadratic exponent in the erfc function's integrand, i.e., erfc(z)∝$\int_z^\infty e^{-t^2}dt$ ultimately results in the sharp transition. To find the corresponding expected bit error, we multiply the overlap in error by twice the probability ρ(N,K) that the values belong to the Gaussian spikes immediately before or after the threshold $y_{th}$. Assuming ⟨$\varepsilon_b$⟩ is small, we get the expression for expected hash error ⟨ε⟩: ⟨ε⟩ ≈256ρ(N,K)ε($\sigma_{out}$).

There are two major sources of error contributing to $\sigma_{out}$: systematic and photodetector noise. If the ratio S given measured power P and Gaussian noise error δP is defined as S(P)=√Var[δP]/P, the contribution to $\sigma_{out}$ corresponds to $\sigma_{noise}$≈S($p_{th}$)$y_{th}$/2 in the amplitude domain given δP<<P. For our systematic error analysis, caused by drift and fabrication error, we define error scaling σ varying from 0 to 0.01 and define error weights w=[$w_{\theta,\phi}$, $w_{BS}$, $w_{loss}$] such that σ=[$\theta_{\alpha,\phi}$, $\sigma_{BS}$, $\sigma_{loss}$]=σw for loss, phase, and coupling errors respectively. We find $\sigma_{out}$ increases nearly linearly with N, K, σ. However, phase and coupling cross terms appear since MZI coupling errors can be reparametrized as phase errors and vice versa. Ultimately, we achieve ~ 3% error in predicted $\sigma_{out}$ compared to simulated data using (FIG. 2D):

$$\sigma_{out}^2 \approx N^2 K^2 \sigma^2 [w^T \Sigma(N,K,\sigma) w] + \sigma_{noise}^2 (P_{mode}). \quad (1)$$

Here, the correlation is modelled as $\Sigma=\Sigma_1+\Sigma_\sigma \sigma+\Sigma_{N\sigma} N\sigma \in \mathbb{R}^{3\times 3}$ where Σ is a symmetric matrix modelled given data sampled at w=[0, 0, 3], [0, 1, 0], [1, 0, 0], [1, 1, 0], [1, 1, 3], σ=0 to 0.01. As is evident in FIG. 2A, error distributions are roughly Gaussian, though our simulations suggest that coupling error $\sigma_{BS}$ results in a right-skew compared to the more symmetric distributions from loss and phase error. The error increases monotonically with N, K, σ and positive correlations in phase-coupling are observed (FIG. 2D), while the loss is relatively uncorrelated to the other two errors.

In FIG. 2E, 2F, we explore tradeoffs between error $\sigma_{out}$ and packet error rate (e) or PER given N, K, σ, $P_{mode}$. Due to error-energy tradeoffs for optical receiver circuitry (Tables 1-2), energy efficiency of LightHash may be dominated by optical power required in a GHz-scale chip. Large input optical power is required since loss scales exponentially with the circuit depth 2N, requiring per-mode optical input powers $P_{mode}$ near 1 mW. Photonic meshes have a sharp maximum N separating the feasible and infeasible regions to avoid an explosion in input optical power required for an idealized LightHash SVD chip. Critically, the "feasible" and "photonic advantage" regions overlap; advantage is achieved above the dashed curve at 10 fJ/MAC outperforming efficient, equivalent digital implementations requiring 80 fJ/MAC for 3-bit K=5). We additionally explore systematic error scalability in FIG. 2F for w=[1, 1, 3]; while calibration and self-configuration may sidestep such issues in sufficiently small circuits, the phase, coupling and loss error scaling notably require σ<0.1% for LightHash to work.

Experimental Evaluation

Figure 3A:
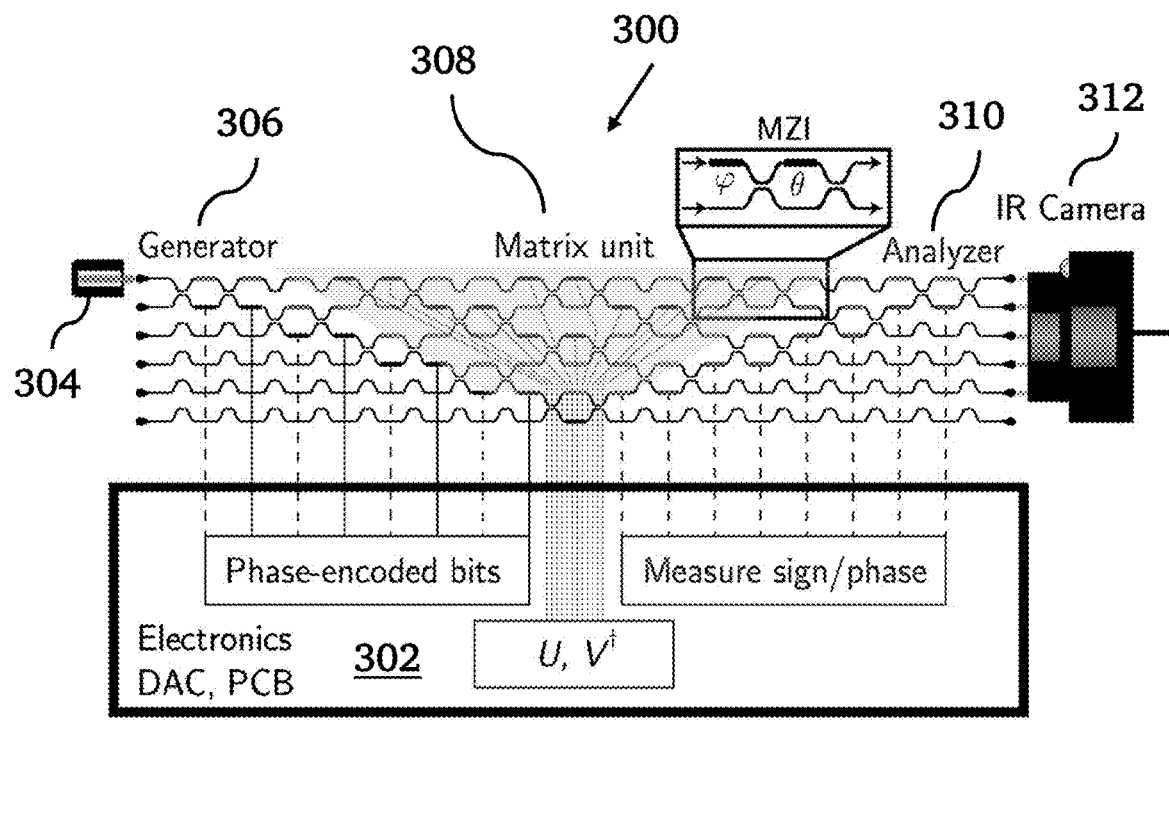
FIG. 3A is a schematic diagram showing an experimental setup used to evaluate the a proof of work protocol according to an embodiment of the invention.
Figure 3A:
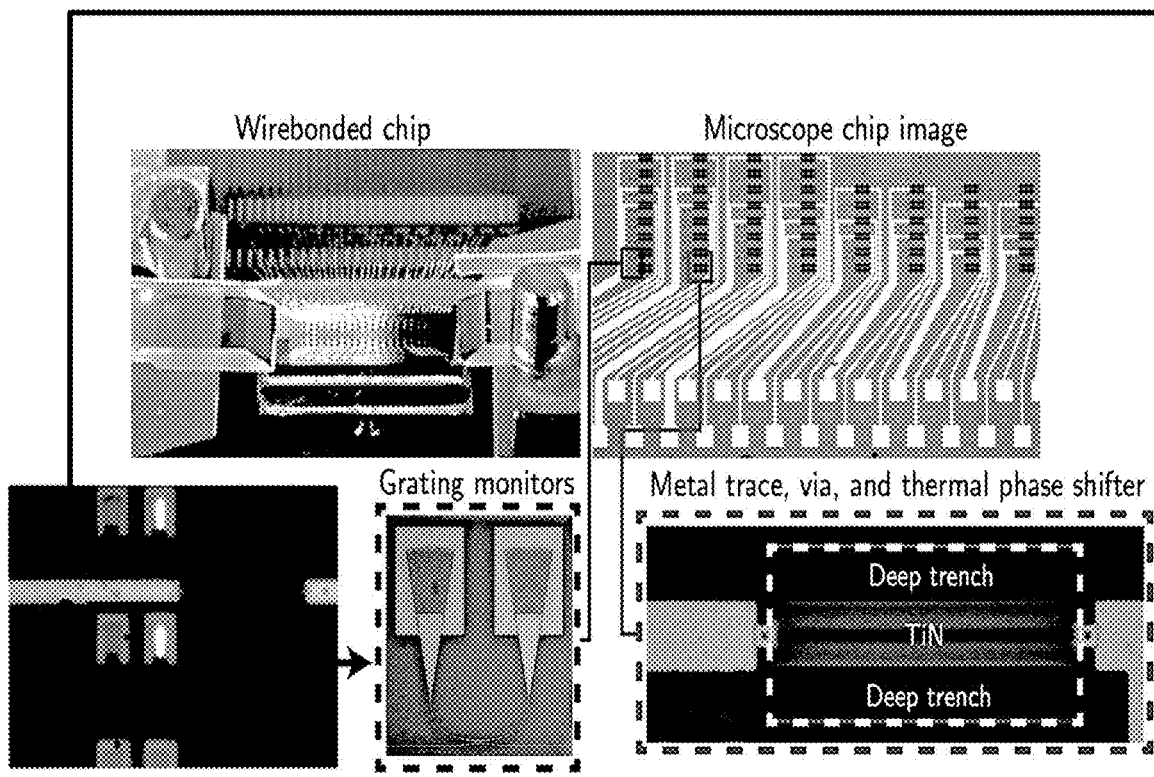
Figure 3B:
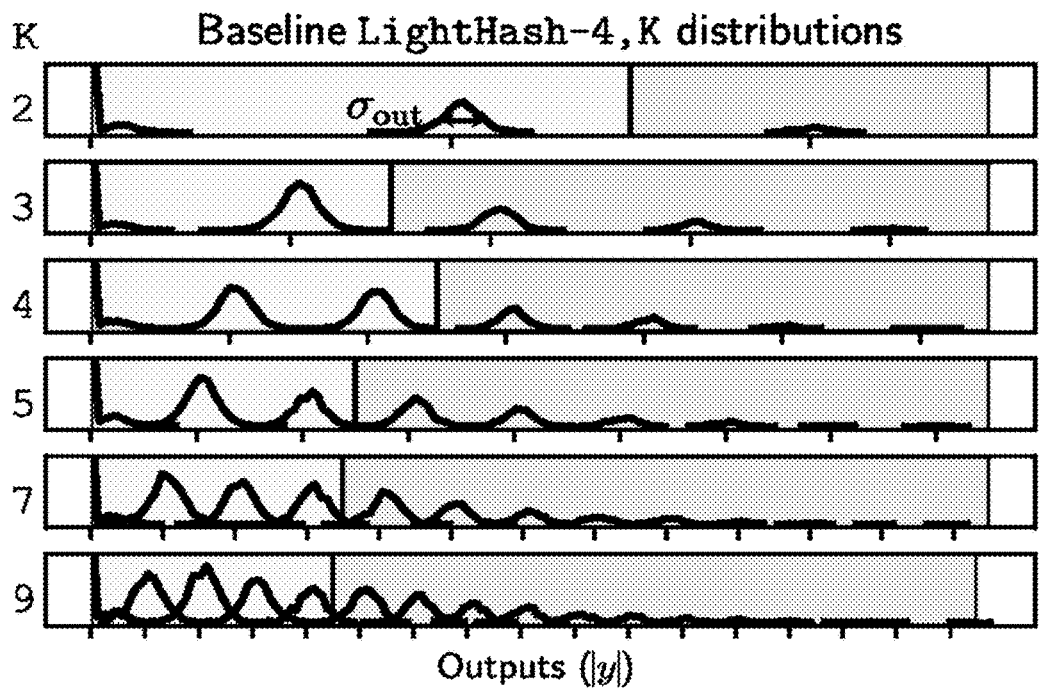
FIG. 3B shows experimental outcome histograms for random matrices for varying K values.
Figure 3C:
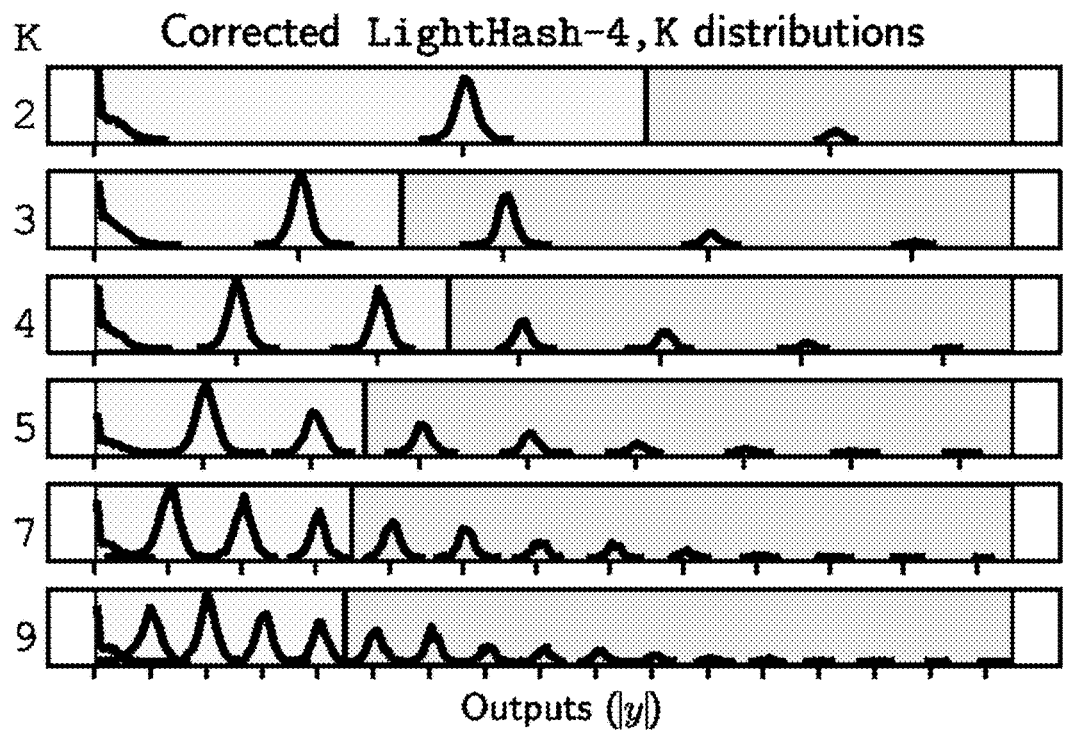
FIG. 3C shows histograms for hardware-agnostic error-mitigated implementations for varying K values.
Figure 3D:
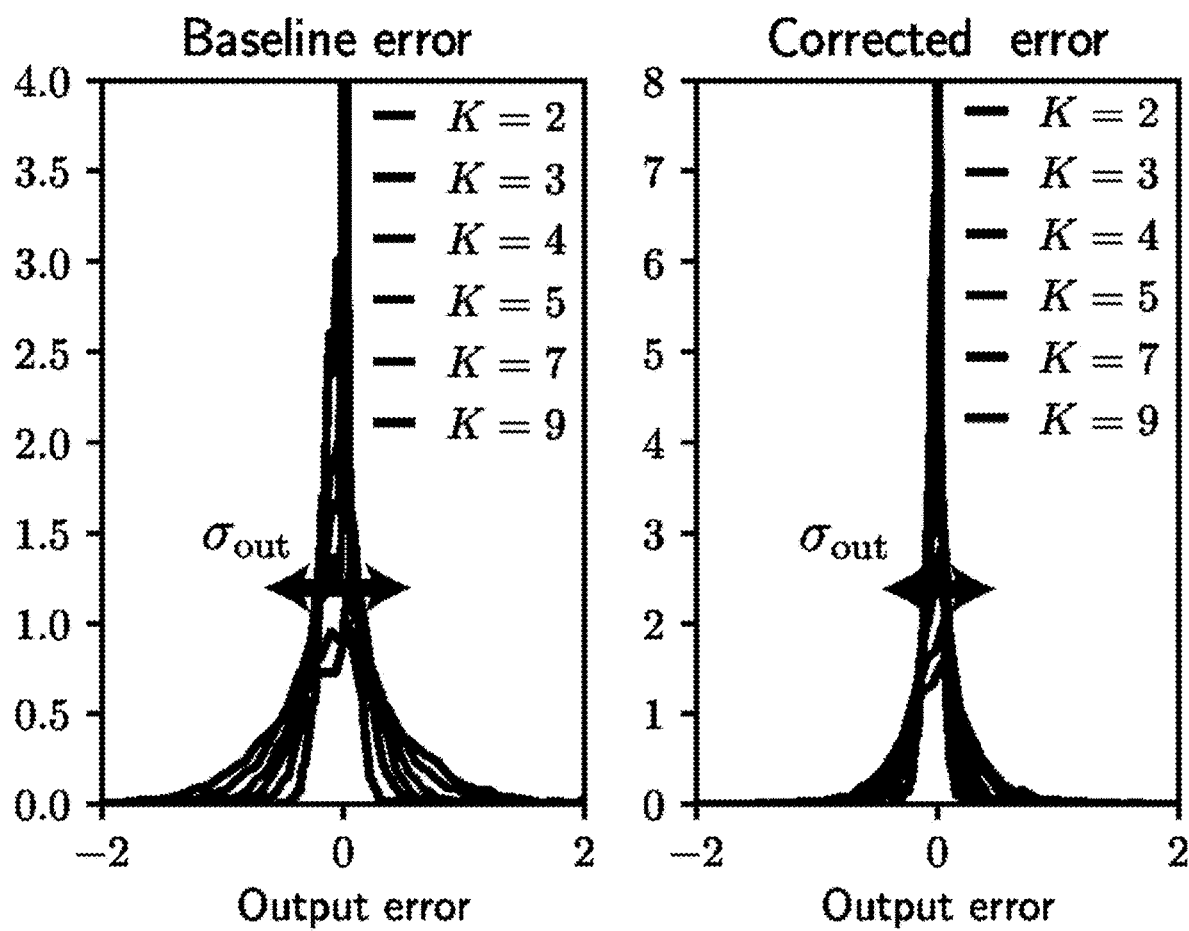
FIG. 3D are graphs showing a comparison between the baseline and hardware agnostic error mitigation error distributions.
Figure 3E:
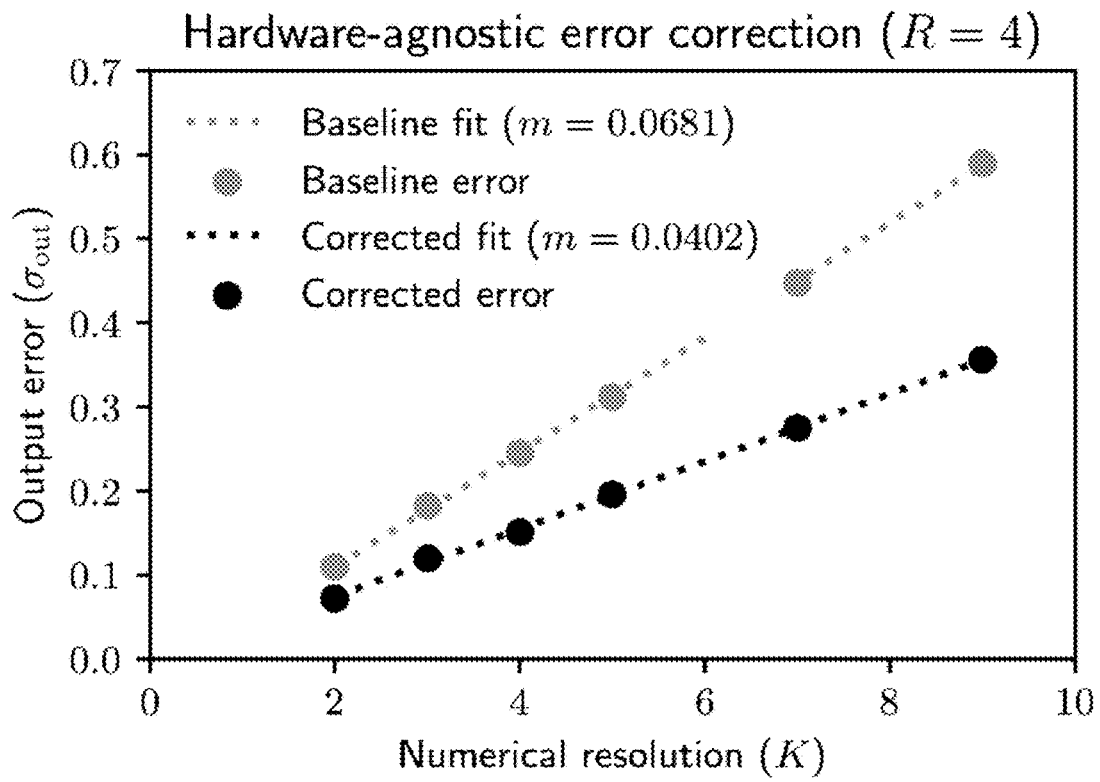
FIG. 3E is a graph of the standard deviation of output error as a function of K for both the baseline and corrected (error-mitigated) implementations.
Figure 3F:
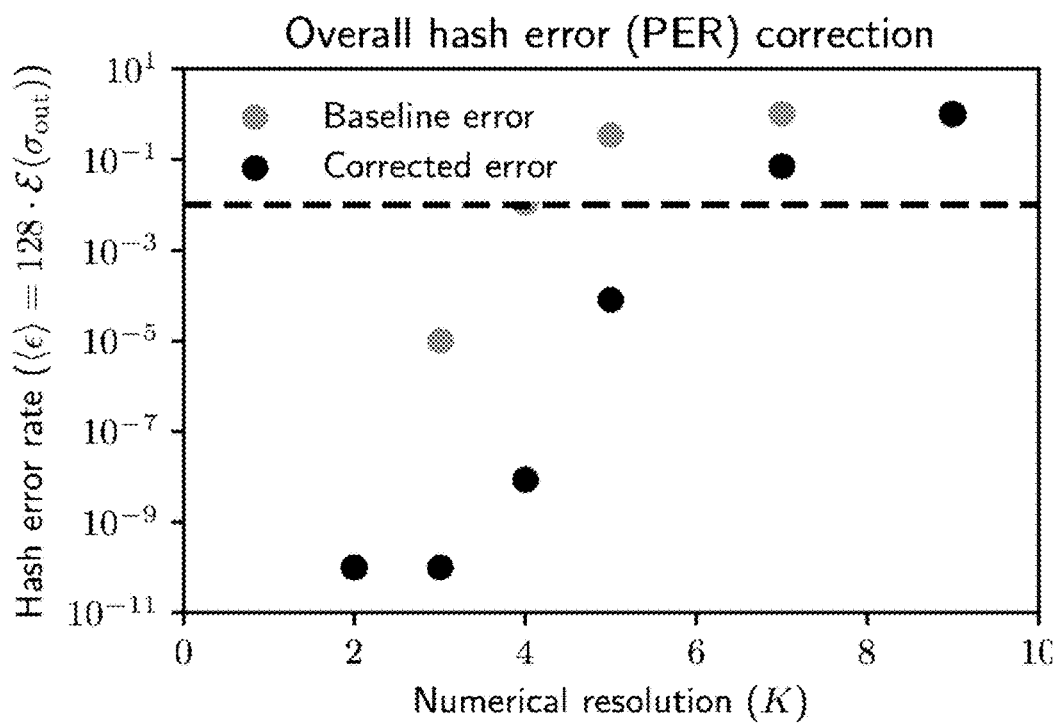
FIG. 3F is a graph of hash error rate for baseline and error-mitigated cases as a function of K.
Figure 3G:
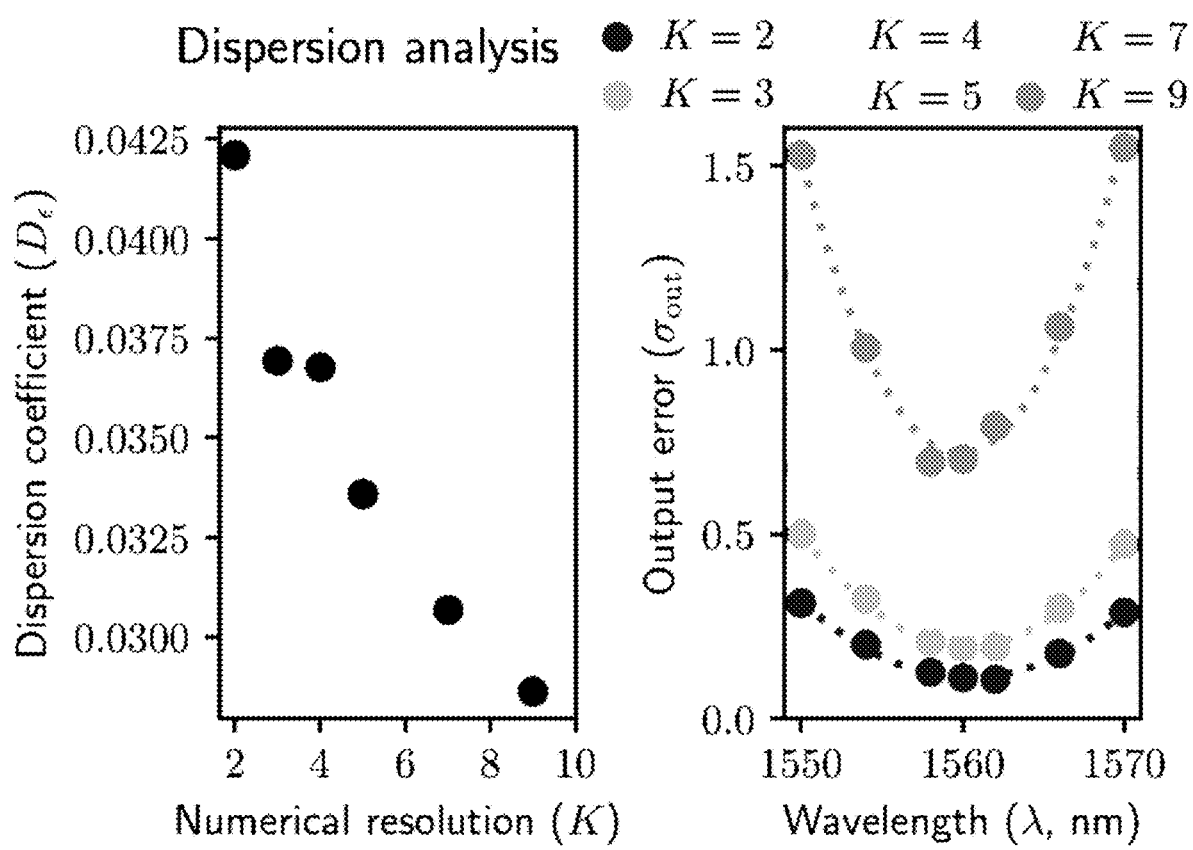
FIG. 3G are graphs of dispersion of the error given calibration at the center wavelength for different values of K.

FIGS. 3A-3G illustrate an experimental evaluation of LightHash. FIG. 3A is a schematic diagram showing an experimental setup used to evaluate the LightHash protocol (N=4, variable K) which involves running U, V on-chip 300 and multiplying singular values off-chip 302. The chip includes a laser 304, generator 306, matrix unit 308, and analyzer 310. The output measurements are made using IR camera 312 readings of grating tap monitors placed along the output waveguides of the photonic mesh. The physical wirebonded and thermally controlled setup along with a microscope image and image of integrated thermal phase shifters are shown in the images to the right. FIG. 3B shows outcome LightHash histograms for 250 random matrices Q given N=4 for varying K for baseline and FIG. 3C shows histograms for hardware-agnostic error-mitigated implementations. The shaded regions correspond to a bit assignment of 0 and 1 by digital thresholding. FIG. 3D are graphs showing a comparison between the baseline and hardware agnostic error mitigation error distributions (subtracting the ideal values from the outcome histograms in FIGS. 3B, 3C). FIG. 3E is a graph of the standard deviation of the error, $\sigma_{out}$, which is roughly proportional to K for both the baseline and corrected (error-mitigated) implementations, with the corrected implementation having a much smaller slope m. FIG. 3F is a graph showing sharp transition in feasibility for the baseline and error-mitigated cases as a function of K (similar behavior is expected for N). FIG. 3G are graphs of dispersion of the error given calibration at the center wavelength 1560 nm showing parabolic increase in error around the center wavelength as expected, but the dispersion coefficient interestingly decreases with K.

Now that we have defined our protocol and simulated the scalability of the technique, we experimentally quantify errors in a 4×4 port MZI mesh network (i.e., N=4) as a function of bit resolution K using our custom designed chip and the experimental setup in FIG. 3A. To estimate these errors, we record a distribution of output magnitudes at the network output given random z, Q. Using this, we assume we can achieve an experimental estimate of $\sigma_{out}$ measured across many devices. As expected and shown in FIG. 3B, 3C, the distribution follows a discretized half-normal distribution with Gaussian-distributed spikes at each of the possible outputs.

Next, as shown in FIGS. 3D, 3E, 3F, we perform an error mitigation analysis by singular value permutation as previously discussed. The singular value decomposition is invariant given any permutation identically applied to the rows of $V^\dagger$, the columns of U, and the singular values of Σ, i.e., $Q=U\Sigma V^\dagger=(UP)(P\Sigma)(PV^\dagger)$, where P is a matrix that implements the permutation. Therefore, error mitigation is possible by applying different P to the R meshes implementing Q. The proof of invariance is that $Q_{ij}=\Sigma_{k=1}^{N}U_{ik}\Sigma_{kk}V_{kj}^\dagger$ and k can be relabeled in any order, resulting in the same Q by symmetric property of addition. In our case, we average the result over four cyclic permutations of the singular values, i.e., (1, 2, 3, 4), (4, 1, 2, 3), (3, 4, 1, 2), (2, 3, 4, 1). As expected in FIG. 3E, error is roughly halved when R=4; the slope is reduced by about 41%, not quite 50% possibly due to noise. Therefore, averaging results over devices implementing Q with permuted singular values can significantly reduce the error at the expense of increased device footprint.

Finally in FIG. 3G, we consider the "error dispersion" relation $\varepsilon(\lambda)$, exploring the effect of wavelength on the error to explore the possibility of parallelizing the computation over multiple wavelengths in a 20 nm wide band at our empirically determined optimal wavelength $\lambda_c$=1560 nm:

$$\varepsilon(\Delta)\approx\langle\varepsilon\rangle[1+D_\varepsilon(\Delta\lambda)^2], \quad (2)$$

where $\Delta\lambda=\lambda-\lambda_c$ and $D_\varepsilon$ is the "relative" error dispersion (that depends on N, K) evaluated at $\lambda_c$. Our results in FIG. 3G indicate that this relative dispersion coefficient as defined in Eq. 2 actually decreases slightly with K. Note that there is an increase in absolute dispersion, but a decrease in the relative error dispersion. More broadband rapid adiabatic couplers (at the expense of size) and multimode interferometers (at the expense of loss), along with long and broadband phase shifters, can improve the error dispersion, possibly allowing for parallelization or batching of multiple bitvector inputs through the same device.

The ultimate goal of our experimentally measured hash error rate prediction is to determine the conditions for which a photonic system could feasibly solve LightHash in the presence of realistic errors. Our findings suggest error mitigation results in a larger range of "feasible" K values for N=4 (defined to be <1% hash rate error indicated by dotted line in FIG. 3F) which would be the first, to our knowledge, experimental proof of feasible digitally verifiable photonic computing for cryptocurrency and potentially other blockchain applications.

Discussion and Outlook

Our results suggest that a digitally verifiable photonic mesh for proof of work applications such as cryptocurrency requires sufficient input optical power and well-calibrated, precisely calibrated photonic circuits to guarantee the error rate is sufficiently small to verify transactions with high probability.

In this work, we improve on past proposals (e.g., HeavyHash) which can be too sensitive to error. First, we propose LightHash to modulate the "difficulty" of a problem by changing the bit resolution K. If a photonic mesh is used to implement LightHash, for larger values of N and K, the likelihood of error is dramatically increased and the output error scales roughly as $\sigma_{out} \propto NK\sigma$, where σ is a component-wise phase or coupling error (in radians) or component-wise loss error (in dB) localized to the phase shifters. In addition, noise can play a major role in the energy-error tradeoff (FIG. 2E), which may dominate the energy consumption at large N due to optical losses in photonic circuits. We bound N to guarantee minimum state space size (large $(2K)^N$) and optical power does not dominate the overall power (FIG. 2E). Second, we propose "hardware agnostic error mitigation" to reduce the error in addition to current error mitigation protocols such as self-configuration, hardware-aware error mitigation, and gradient-based approaches.

To achieve a feasible blockchain technology for cryptocurrency mining, we reduce hash error rate $\langle\varepsilon\rangle$ and improve energy efficiency using sufficient reduction of systematic error $\sigma_{out}$, low-loss optical components, and development of robust, low-energy photodetector circuitry. Error mitigation resulting in a decrease of $\sigma_{out}$ from 0.5 to 0.25 (using R=4, which multiplies device footprint by 4) can reduce $\langle\varepsilon_b\rangle$ by four orders of magnitude. This observation, in addition to FIG. 2C and FIG. 3F, suggests that the feasibility barrier is sharp so error mitigation reduces $\sigma_{out}$ mostly in cases where feasibility is marginal. Other optical matrix-vector multiplication architectures (e.g., photoelectric multiplication using homodyne detector banks or crossbar arrays) may provide robust operation for accelerating low-bit precision multiply-and-accumulate operations at large scale.

Our results justify the choice of photonic blockchain and optical proof of work over a digital alternative to carry out the LightHash proof of work scheme. First, LightHash miners would choose photonics since the energy efficiency and reduced latency for photonic matrix multiplies lead to higher profits. With increased adoption, "mining pools" using photonic hardware can result in a consistent stream of income for a photonic versus digital miner. Our total photonic energy projection for N=64 LightHash is less than 10 fJ/MAC (FIG. 2E), up to an order of magnitude less energy than digital hardware implementing equivalent matrix-vector multiplication. Assuming SHA-256 is handled by the Bitmain Antminer S19 Pro operating at 0.03 pJ/H efficiency, we estimate that the corresponding LightHash energy is roughly 7× lower for photonic implementations (roughly 0.194 nJ/H for optics+Bitmain versus 1.34 nJ/H for Wrap-Net+Bitmain). Second, photonic hardware used in hash protocols can also be used for other applications, i.e., the hardware is not necessarily an application specific device. Importantly, the chip we use to explore cryptographic hash functions was used to perform inference tasks and backpropagation training in photonic neural networks. Thus, in the context of LightHash, photonic mining hardware has key advantages over digital application-specific hardware that implements energy-efficient cryptography but serves no other purpose.

Methods

Chip Design

We have designed a 6×6 photonic mesh chip fabricated by Advanced Micro Foundries (AMF) in their silicon-on-insulator platform capable of implementing 4×4 matrix-vector multiplication. The phase shifters controlling the generator and the mesh itself are all titanium nitride (TiN) and are all calibrated to achieve up to $27\pi$ phase shift as a polynomial function of the square-voltage applied across each of the phase shifters. The calibration proceeds by sending light progressively to each MZI in the device starting from the left-most to the right-most MZI and sweeping phase shifts from 0 to 5 volts. More details on this calibration are provided below. One feature of our mesh design is that there are grating taps at each of the waveguide segments of the MZIs capable of outputting a small fraction (~3%) of the power in the guide. These are used to measure the powers after each MZI to calibrate phase shifts and are also used to measure the outputs of the device using an IR camera.

Experimental Setup

The photonic mesh chip is wirebonded by Silitronics Solutions to our custom-built PCB designed to interface with an NI PCIe-6739 controller for setting programmable phase shifts throughout the device. The input optical source is a Agilent 81606A tunable laser with a tunable range of 1460 nm to 1580 nm. To measure powers coming out of grating taps, we use an infrared (IR) Xenics Bobcat 640 series camera set to "raw" mode connected to an IR/visible microscope with an infinity corrected Mitutuyo 10× IR objective lens attached to a 40 cm tube lens. This optical setup is fixed to a movable Applied Scientific Imaging (ASI) stage to image optical powers emitted from the grating taps.

Automation of the LightHash algorithm is accomplished via USB/GPIB connections to the tunable laser, MXIe-PCIe slot connection to the NI control board, and ethernet connection to the camera for measurements and calibration. A graphical user interface is designed using Holoviews/Bokeh and Python to debug the device and analyze the calibration. The chip consists of 6×6 photonic meshes with grating inputs and fiber array optical interconnects (constructed by W2 Optronics) shown in the image of FIG. 3A. These are wirebonded to a custom PCB ordered via Advanced Circuits which also features a thermistor and thermal connection to a thermoelectric cooler on an aluminum mount for efficient thermal stabilization based on a feedback loop.

Calibration and Operation

In order to operate the mesh as a 4×4 matrix-vector multiplier, we couple the tunable coherent laser to the top input of the device via the fiber array interconnect and use the first diagonal of MZIs to function as an optical setup machine or generator. We take an initial reference image to get a background and then to measure the spots intensities or powers, we sum up the reference-subtracted pixel values that "fill" the appropriate grating taps throughout the device. We ensure that saturation does not take place by reducing the laser power to approximately 50 µW at 20 ms integration time, which suggests nW camera pixel sensitivity as expected. The output powers are all normalized based on the total power in the system (sum of all grating taps along a column of MZIs or waveguides), which automatically removes any laser power fluctuation not originating from the photodetector measurement (i.e., from the laser source itself). The units of power used in this work are based on renormalizing this power based on the input into the system such that the total power propagating through a column of waveguides is 1.

Because our architecture is capable of implementing only unitary matrices (not an SVD architecture), we elect to perform the singular value operation ($\Sigma$) on the computer and the majority of the computation (unitary matrices $U, V^\dagger$) on the photonic chip. Since only four phase shifters are required to implement these singular value operations (versus 32 for the unitary operators), we assume that the experimental evaluation of the overall SVD architecture is roughly the same as multiplying by the appropriate singular values and evaluating $U, V^\dagger$ separately as indicated in the green box of FIG. 1B.

Node Error Model

As discussed in the main text, we explore three sources of error in simulation: loss, coupling and phase. Each source of error arises from various fabrication imperfections or phase drift sources. In order to formalize these error contributions, we define an ideal MZI node and contrast the ideal operation from the non-ideal operation (phase, coupling, and loss error). All of our calculations are performed using our open source Python photonic simulation code simphox.

The ideal MZI node in terms of building blocks that consist of a $\phi$ phase shift, 50:50 coupler, $\theta$ phase shift, and another 50:50 coupler, giving us the following mathematical representation acting on modes $x_1$, $x_2$ and yielding outputs $y_1$, $y_2$:

$$\begin{bmatrix} y_1 \\ y_2 \end{bmatrix} = i \begin{bmatrix} e^{i\phi}\sin\frac{\theta}{2} & \cos\frac{\theta}{2} \\ e^{i\phi}\cos\frac{\theta}{2} & -\sin\frac{\theta}{2} \end{bmatrix} \begin{bmatrix} x_1 \\ x_2 \end{bmatrix} \quad (3)$$

$$y = T_2(\theta, \phi)x,$$

With the above errors, the transmission matrix $T_2$ from Eq. 3 becomes:

$$\tilde{T}_2(\theta, \phi) = B_{\epsilon_r} \begin{bmatrix} e^{i(\theta+\delta\theta)} & 0 \\ 0 & 1 \end{bmatrix} B_{\epsilon_\ell} \begin{bmatrix} e^{i(\phi+\delta\phi)} & 0 \\ 0 & 1 \end{bmatrix} \quad (4)$$

$$B_\epsilon = \begin{bmatrix} C_\epsilon & iS_\epsilon \\ iS_\epsilon & C_\epsilon \end{bmatrix}$$

where we model the beamsplitter error using $$C_\epsilon = \cos\left(\frac{\pi}{4} + \epsilon\right), S_\epsilon = \sin\left(\frac{\pi}{4} + \epsilon\right),$$

and $\delta\theta = \delta\eta + i\delta\xi$, where $\delta\eta$ is a phase error and $\delta\xi$ is a loss error. Note that since loss is generally expressed in dB units, the effect on overall error compared to phase differs by simply a change of the logarithm base, a constant $10 \log_{10} e \approx 4.3$, which is the reason the loss error is scaled differently in the weighting in the main text error model.

The errors may generally be stochastically modelled according to normally distributed variations as follows:
1. The coupling errors $\delta \sim \mathcal{N}(0, \sigma_{BS}^2)$, where $\sigma_{BS}$ is fabrication or drift error which is present in an MZI.
2. The phase errors $\delta\eta \sim \mathcal{N}(0, \sigma_{\delta,\phi}^2)$, where $\sigma_{\delta,\phi}$ is phase error (thermal or electrical crosstalk or operating point drift) which is present in an MZI.

3. When incorporating loss imbalance error, we have $\delta\xi \sim \mathcal{N}(0, \sigma_{loss}^2)$.

Note that loss imbalance errors $\delta\xi$ only needed in the positions of the phase shifters; all remaining losses may be "pushed" to the end of the mesh by algorithmically applying commutations of common mode losses in the MZIs. Ultimately, grating coupler efficiency variations and the algorithm to move all losses to the branches will combine to give an array of N independent loss elements, but this can be effectively calibrated out by the network by scaling the power threshold $P_{th}$ by these constant loss terms.

Phase Shifter Calibration

As discussed in the main text, the calibration protocol involves sweeping phase shifter voltages such that the phase is calibrated from 0 to $2\pi$.

Each phase shifter is calibrated by optical interference measurements evaluated at each MZI output in the mesh. The split transmissivity measured from spots ca be modelled as $t = \sin^2 \theta$, where $\theta$ is twice the phase shift in the internal arm, which is used for calibration:

$$t = \frac{p_t}{p} \approx \frac{p_t}{p_r + p_t} \quad (5)$$

where t is the transmissivity, p is the total power at the input, $P_{th}$ is the cross state grating power and $p_r$ is the bar state grating power determined by summing up pixel values from the camera.

The model is:

$$\theta = p_0 v^3 + p_1 v^2 + p_2 v + p_3$$

$$t = a \sin \theta + b. \quad (6)$$

Empirically, it suffices to fit $v^2 = q_0\theta^3 + q_1\theta^2 + q_2\theta + q_3$ to convert voltage to phase.

The calibration proceeds by first calibrating all internal phase shifters ($\theta$ phase shifts) and then calibrating all external phase shifters ($\phi$ phase shifts) using the already calibrated $\theta$ phase shifts. In order to address each of the individual MZIs, we use a calibration techniques which treats already-calibrated MZIs as switches to progressively calibrate MZIs from input-to-output in the network. A useful trick for calibrating the external phase shifts is to create "meta-MZIs" in the mesh, where external phase shifts $\phi$ can be treated as internal phase shifters in an MZI by setting appropriate $\theta$ phase shifts to $\pi/2$.

Mining Pool Implementation

It is important to have a sense for the expected hash error rate (e) for a given LightHash-based miner upon widespread adoption of a photonic proof of work-based cryptocurrency. While an accurate hash computation isn't required unless the block is solved, intermediate mining rewards in "mining pools" are typically offered to miners in units of "shares" that have a much lower difficulty $B_{share} \ll B$ than the final proof of work solution, where B as defined earlier represents the number of bits for proof of work. Mining pools act as a single mining entity consisting of many individual miners that earn shares in proportion to the amount of work they do. Mining pools are chosen by miners who do not have the capability of getting significant profits by mining alone. Getting a share is generally proof that the "correct" proof of work is being performed. Accurate mining is important to ensure that these shares can be earned at a sufficiently high percentage to reap profits. Therefore, the error rate multiplied by the number of shares will yield the total profit for the miner. Note that there is no penalty for a failed calculation for a nonce that does not yield any share reward.

Figure 4A:
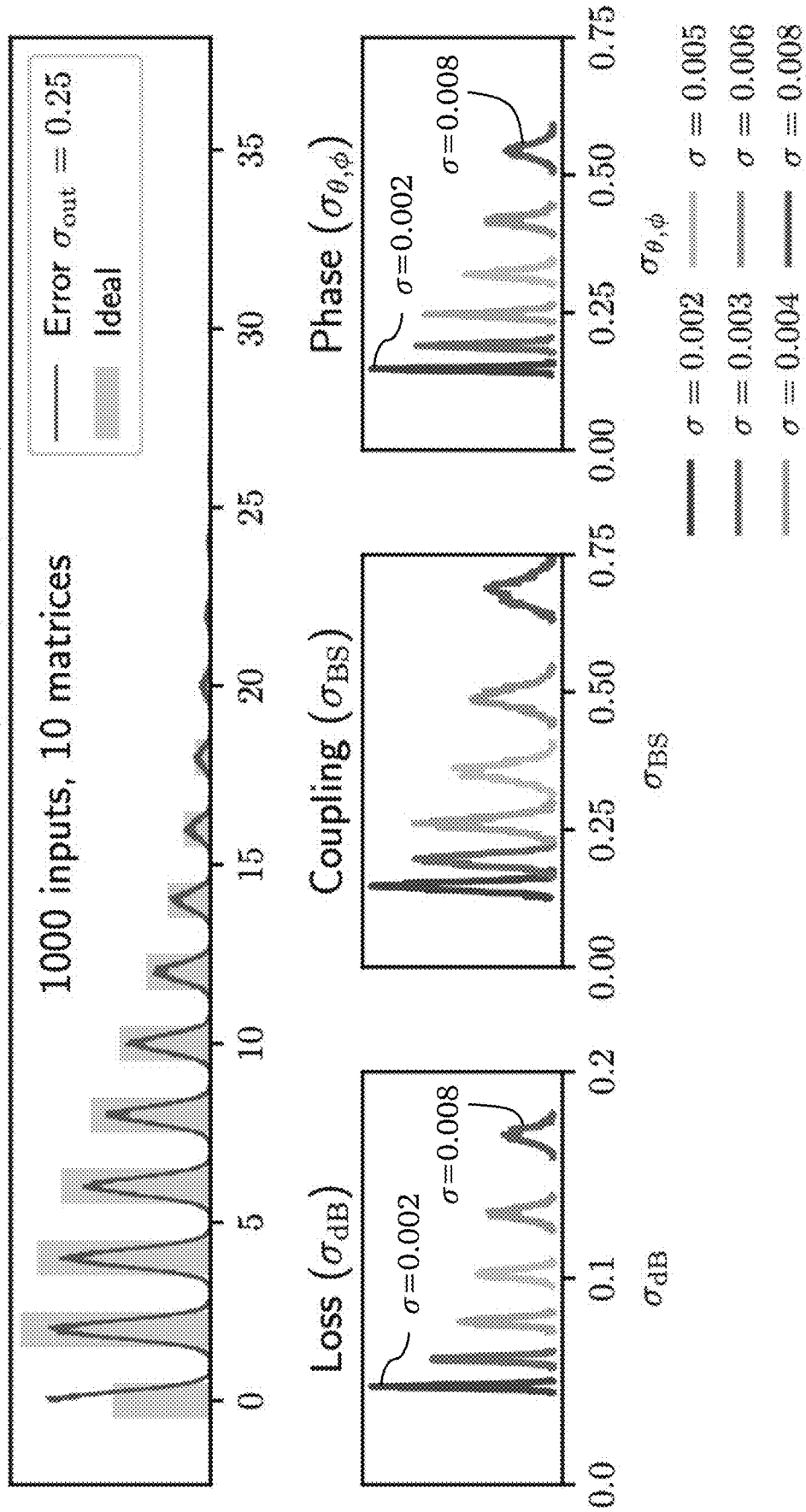
FIGS. 4A, 4B are histograms of errors and discrete outputs for (N,K)=(32,4) and (N,K)=(64,2), respectively.
Figure 4B:
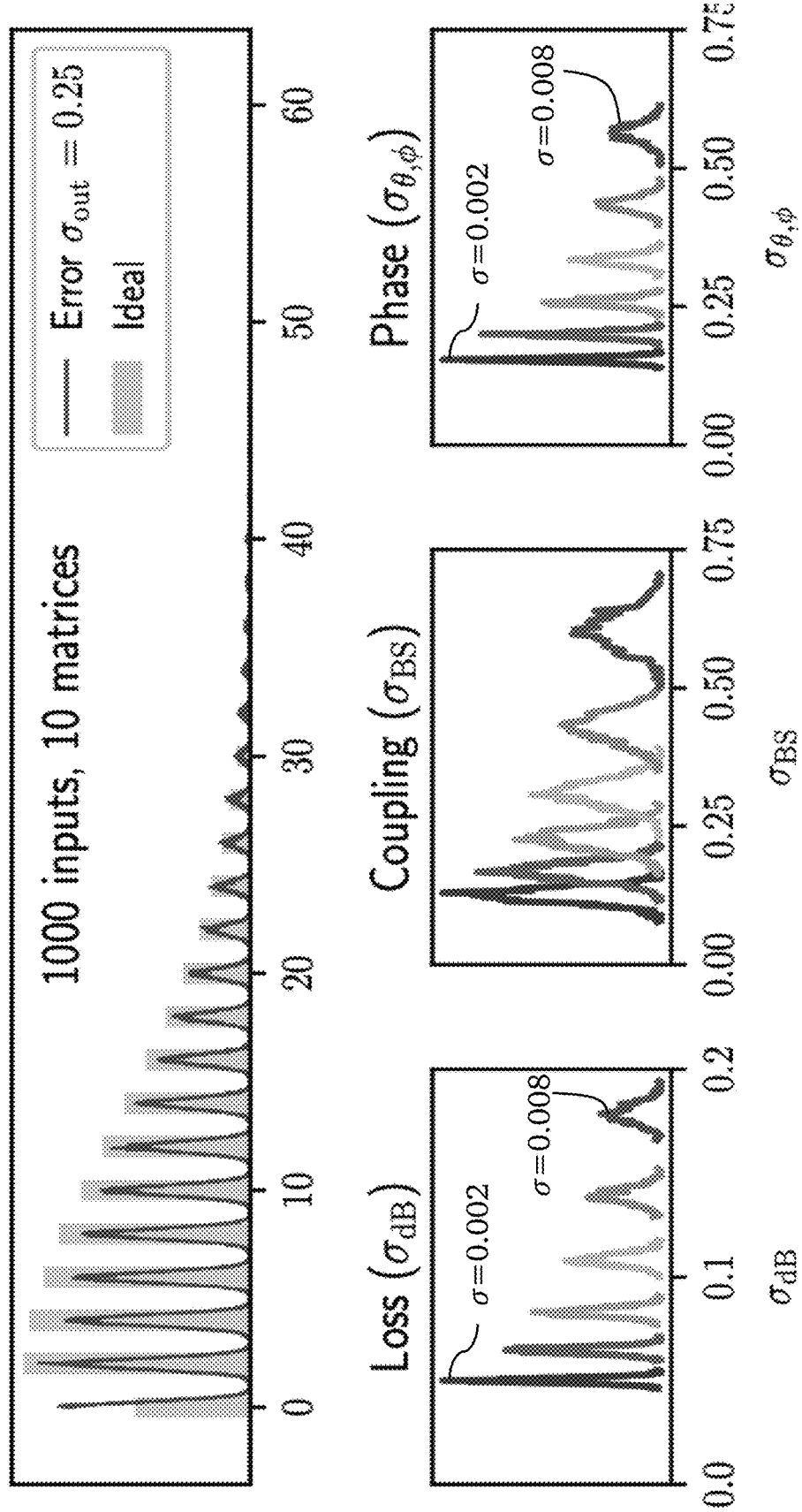
Figure 4C:
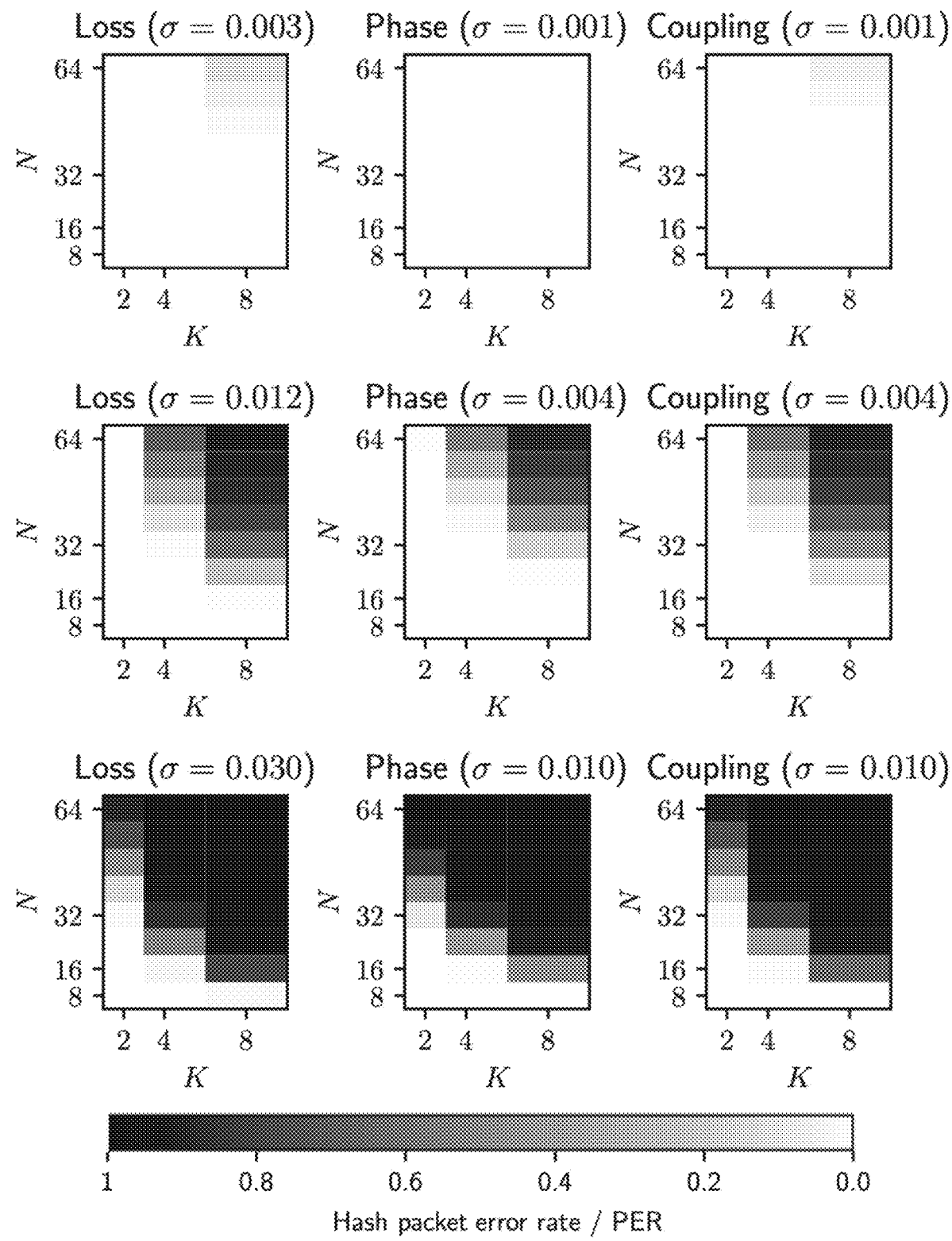
FIG. 4C are plots showing the error scaling dependence on the selection of (N,K) design parameters.

FIGS. 4A, 4B, 4C are graphs extending the simulation results discussed earlier. Specifically, we analyze error scaling by plotting the histogram of errors and discrete outputs with $\sigma = 0.25$ for FIG. 4A (N,K)=(32,4) and FIG. 4B(N,K)=(64, 2). The histograms are evaluated over 10 matrices Q, 1000 inputs x and 1280/N errors given loss, coupling, and phase component errors $\sigma$. We find that the errors are similar to each other (confirming approximate NK$\sigma$ scaling) but not exactly the same (loss errors are slightly larger but coupling errors are smaller for N=32). In FIG. 4C we analyze the error scaling of dimension K instead of component error $\alpha$, finding feasible operation of K=2, N=32 or NK=64 for an error of roughly 0.01 radians for phase and coupling and 0.03 dB for loss. The transition between feasible and infeasible (N,K) is very sharp.

General Purpose Usage

The functionality of a photonic mesh as general purpose hardware is key to their fit as an optical proof of work device. For Bitcoin, the most efficient (and thus profitable) mining equipment are electronic application-specific integrated chips (ASICs) such as the Antminer S19 by Bitmain, which coerce miners to rely on the services of centralized institutions. Other coins such as Ethereum are ASIC resistant and can be profitably mined using more general purpose Graphical Processing Units (GPUs) or Field-Programmable Gate Arrays (FPGAs). This creates less hardware investment risk for miners because the GPUs and FPGAs have general use cases as opposed to mining ASICs; namely, GPUs can be used for graphics engines and machine learning applications and FPGAs are used for low-energy digital signal processing. Likewise, photonic mesh technology can be applied across several applications, with industry effort already underway in applications such as machine learning and fast signal processing. This ultimately mitigates the risk of buying new photonic hardware, if it can ultimately accrue monetary value via mining when not used for other purposes. The photonic mesh is capable of machine learning inference.

Energy Versus Error Tradeoff

In this section, we justify the scaling analysis in FIGS. 2A-2F, which posits that there is a photonic advantage in the feasible regime of operation of a LightHash chip. The photonic advantage above a digital equivalent is contingent on the exact implementation of a matrix-vector multiplier: namely, the size N and the bit resolution K. There are many factors to consider including the optical energy of the laser, optical interconnect coupling efficiency, and driver and amplifier energies. To start, we assume that all devices are implemented on the same chip, so the necessary energy to drive the various optical components and time and communicate the bit-wise signals into chunks for the matrix-vector multiply are shared by the digital and optical chips, which greatly simplifies our analysis. In this case, the energy needed to drive the input modulators is already provided by the output of the SHA3-256 accelerator and its accompanying timing circuit (out of scope for this analysis as the circuit would be the same in either the digital or optical cases).

The remaining key component specifications for comparison are provided in Table 1, which offer a rough guideline of current electronic capabilities (i.e., improvements can be possible as these do not necessarily imply fundamental operational limits). The per-mode optical power is a design choice to ensure sufficient average received power at each output detector. This assumes that phase shifters with less than 0.05 dB loss can be designed with MEMS in a compact footprint while directional couplers are well-known to achieve less than 10 mdB losses (higher-voltage robust designs can achieve 0.5 dB). The key scaling relation in our system is the overall optical loss for practical photonic systems, which scales exponentially with N as shown in Table 1 and sets a lower limit to the optical power required to power the matrix-vector multiply. In the near term, this suggests an upper limit of N=64, requiring a per-mode optical power of roughly 700 fJ, reducing the energy efficiency by a factor of 3. To achieve N=256 (the maximum for LightHash to match the number of input/output bits), significant improvement in optical loss performance is required in phase shifters, i.e., down to 0.01 dB per phase shifter which is admittedly a challenge but necessary to achieve the maximum advantage given specs for current avalanche photodiodes and the error requirements of our system.

The digital implementation of LightHash-N, K consumes most of the computation of 256·N floating point operations (each costing A fJ of energy) exceeds the energy per SHA3-256 hash. In a fully digital implementation, if N=64 and A=0.08 pJ, we would have about 1.31 nJ of energy used for matrix multiply portion. This is much more than the energy required of ASIC hash technology currently costing up to 30 pJ per hash (pJ/H) for Bitmain's state-of-the-art Antminer S19 device which is nearly 2 orders of magnitude lower than the digital SHA cost. This also results in a LightHash rate efficiency of 0.194 nJ/H

TABLE 1

Table of component energies and the corresponding designed per-mode optical power for our system, suggesting roughly 260 fJ power consumption per mode (including optics and photonics) at N = 64 to ensure received power P = 10 µW at the output photodetectors, with the factor of 4 coming from the average loss due to the singular-value loss portion and $10^{0.02N}$ factor acting as a "scale limit" due to passive losses in the optical elements.

| Component | Symbol | Power | Sample freq. | Energy, 1 GHz | Ref. |
|---|---|---|---|---|---|
| Modulator | $E_{mod}$ | 1 µW | 1 GHz | 1 fJ | |
| Transimpediance amp. | $E_{TIA}$ | 4.4 mW | 30 GHz | 145 fJ | |
| Comparator (voltage) | $E_{comp, V}$ | 40 µW | 1 GHz | 40 fJ | |
| Per-mode input power | $E_{mode}$ | $4P \cdot 10^{0.02N}$ µW | 1 GHz | 76P fJ | N/A | for photonics versus 1.34 nJ/H in competitive digital hardware.

In photonic implementations, we consider the component specifications of Table 1. The input modulators, which may include using lithium niobate modulators or silicon-organic hybrid modulators, each require around 1 fJ/bit, and the necessary optical power will dominate the input energy with up to 76 µW per optical mode and the output comparators and transimpedance amplifiers together require at least 185 fJ/bit operating at GHz speeds. As a result, the total energy for N=64 becomes roughly 66.5 pJ of energy which is an order of magnitude less energy than the digital equivalent but still exceeds the energy of the digital portion of the hash. In the limit of lower noise and higher K, however, the 700 fJ/bit requirement discussed earlier results in an increase of total per-hash energy to roughly 250 pJ, still a vast improvement over our chosen digital counterpart.

Next, we consider the three main sources of noise in the system (aside from laser RIN noise, which we show later can be ignored as it can be used as a reference channel at the receiver): shot noise at the photodetector, input-referred noise in the TIA, and comparator offset noise, all of which are presented in Table 2.

The noise error scaled to the integer math problem ($\sigma_{noise}$) referring to the photocurrent (with gain) entering the TIA and accounting for all of the noise sources discussed in Table 2 is as follows, where the TIA transimpedance gain is defined as $G_{TIA}=V_{TIA}/I$ (defined to be 46 dBΩ). We generally require, where $P_{th}$ is the threshold power roughly matching the

TABLE 2

Parameters for Si—Ge avalanche photodiode (APD) noise, TIA input-referred noise performance, and comparators. Note that the photodiode numbers are provided for ~1310 nm, not the 1550 nm used in this work. Based on these numbers, compared to shot noise, the electrical noise dominates until P ≥ 1 µW.

| Parameter | Symbol | Values | Ref. |
|---|---|---|---|
| Responsivity | $\mathcal{R}$ | 0.85 A/W | |
| Dark current | $I_d$ | 100 nA | |
| Sampling frequency | $\Delta_f$ | 1 GHz | this work |
| TIA feedback resistance | $R_f$ | 500 | |
| Noise figure | $F_n$ | 1.5 | |
| APD multiplication | M | 10 | |
| Excess noise factor | $k_A$ | 0.05 | |
| Average received optical power | P | P µW | this work |
| Received photocurrent | I(P) | 8.5P µA | this work, |
| TIA min input-referred noise, 1 GHz | $\sigma_I$ | 0.32 µA | |
| TIA output voltage | $V_{TIA}$ | 268P mV | this work |
| Comparator error | $\sigma_V$ | ~1 mV | | average power per output P (all symbols defined in Table 2):

$$\sigma_{noise}(P) \approx P_{th}\sqrt{\sigma_{th}^2 + \sigma_s^2 + \sigma_I^2 + \sigma_V^2/G_{TIA}^2}/\langle I\rangle \quad (7)$$

$$= p_{thg}\sqrt{4kTF_n\Delta f/R_f + 2qM^2F_A(M)(\mathcal{R}P + I_d)\Delta f +}$$

$$\sigma_I^2 + \sigma_V^2/G_{TIA}^2/(\mathcal{R}PM)$$

$$\leq 0.5,$$

which corresponds to $\sigma_{out} \leq 0.25$ as discussed in the main text since this specification is provided in the power rather than amplitude domain. These numbers (the total of Tables 1 and 2) are compiled into a simulation that allows us to generate the results of FIGS. 2A-2F.

Finally, we would like to provide a brief evaluation of the compute density of our system (which has implications on the hash rate): for N=64 we achieve 2·4096 GOPS/chiplet for N=64, and each MZI has a footprint of roughly 200×50 µm long, resulting in a chip with footprint 25.6 mm×3.2 mm, yielding 80 mm² per chiplet. This can feasibly fit the four necessary 64×64 chiplets in a given LightHash die (CMOS limits are 600 mm²), resulting in up to 100 GOPS/mm². Some improvement can be achieved using a faster bandwidth, e.g., 10 GHz to achieve TOPS/mm² (requiring faster comparators and input modulators, a subject for future work). Other photonic MVM architectures with higher compute density may also be considered at the expense of error and/or energy efficiency.

Digital Equivalent Comparison and LightHash Scaling

The choice of parametrizing LightHash by N, K has to do with adjusting the problem difficulty to achieve feasible bit error rate $\langle\varepsilon\rangle \leq 1\%$. The choice of K and N is of course important when building any blockchain protocol around optical proof of work. Note that there exists a possible "digital attack vector" to consider that can "cheat" on LightHash based on caching results rather than performing the matrix multiply. One such issue is that we work in a finite state space of possible combinations of matrix row and vector combinations.

This means that vector-vector product results can in principle be cached provided there is sufficient memory in the device. Therefore, understanding the total state space size is of critical importance in LightHash to prevent digital attacks. The system we study in this work, N=4, K=2 to 9, is susceptible to a digital attack vector of this kind because there are only 120 to 104976 possible vector-vector products that can feasibly be stored in RAM on a single computer. In general, there are on the order of $C:=(2K)^N$ possible vector-vector products in the state space. Since N, K affect the error equally, increasing N is a more effective way to increase the overall state space to avoid this attack vector compared to increasing K. As an extreme example, if K=64, N=2, we have C=16384 which is feasible to cache but if N=64, K=2, we have $C=3.4\times10^{38}$ which is astronomically large. Despite this scaling argument, an increase in K could be useful for improving the photonic advantage by requiring more bits to represent the possible outputs of the LightHash function, which would require more expensive digital hardware, as we now discuss.

The more conventional route for a digital equivalent of LightHash is a digital ASIC, which can require the same energy requirements as a low-bit resolution neural network. Although coming up with a digital ASIC and energy requirements is beyond the scope of this work, similar investigations of low-bit-resolution and bitwise neural networks have been estimated by other works, such as WrapNet, which includes an example for 3×1 bit multiplication with a 8-bit accumulator, mapping to the case of 64, 8-LightHash explored in this work. More generally, it is known that there is a lower limit in energy consumption due to pulling weights from memory resulting in a minimum of 150 to 200 fJ per 8-bit MAC energies (corresponding to roughly 75 fJ/OP for 3-bit operations, which is close to WrapNet), though some mixed-signal remedies have been proposed such as memristive networks.

The ideal digital mapping can be described using an equivalent digital matrix multiplication Q'z', where Q contains the elements 0, 1, 2, 3, . . . K−1 and x contains the elements {0, 1}instead of {−1, 1}. (Note that for the rest of this section we will incorporate sums between scalars and vectors or matrices, which are meant to represent element-wise summations). The mapping is defined as follows:

$$Q' = \frac{Q+K+1}{2} \quad (8)$$

$$x' = \frac{x+1}{2}$$

We would like the digital platform to compute the bits $b=1\{y<p_{th}\}=1\{|QX|^2<p_{th}\}$, or equivalently whether $|Qx|<\sqrt{p_{th}}$. The equivalent digital expression must be provided for Q', x' while also incorporating the transform equations of Eq. 8 is as follows:

$$Qx = (2Q' - K + 1)(2x' - 1) = 4Q'x' + 2\sum_{i=1}^{N}q'_i - 2(K-1)\sum_{i=1}^{N}x_i + K - 1 \quad (9)$$

Next, we consider the threshold operation $y<p_{th}$. Assume the equivalent threshold values are given by the vectors p±, where $Qx>-\sqrt{p_t}$ corresponds to $Q'x'>p_-$ and $Qx<\sqrt{p_{th}}$ corresponds to $Q'x'<p_+$. These values are given by:

$$p_\pm = \frac{1}{4}\left(\pm\sqrt{p_{th}} - 2\sum_{i=1}^{N}q'_i + 2(K-1)\sum_{i=1}^{N}x_i - K + 1\right) \quad (10)$$

Unlike in the optical case where the target $p_{th}$ is always the same, the digital comparison to $p_\pm$ occurs in the idealized digital implementation (Eq. 10) is a "moving target" threshold which is a function of the sum of the input bits (changed for each operation) and the elements of Q (changed at each block). The accumulator in the digital platform must accommodate the $N_{dig,bits}=\log_2(N\cdot K)$ bits required in the worst case. This means that at the end of the accumulation, two $N_{dig,bits}$-bit comparisons of the matrix-vector product Q'x' must be performed for vectors $p_\pm$, which can complicate the timing and energy consumption of the digital platform.

Figure 5A:
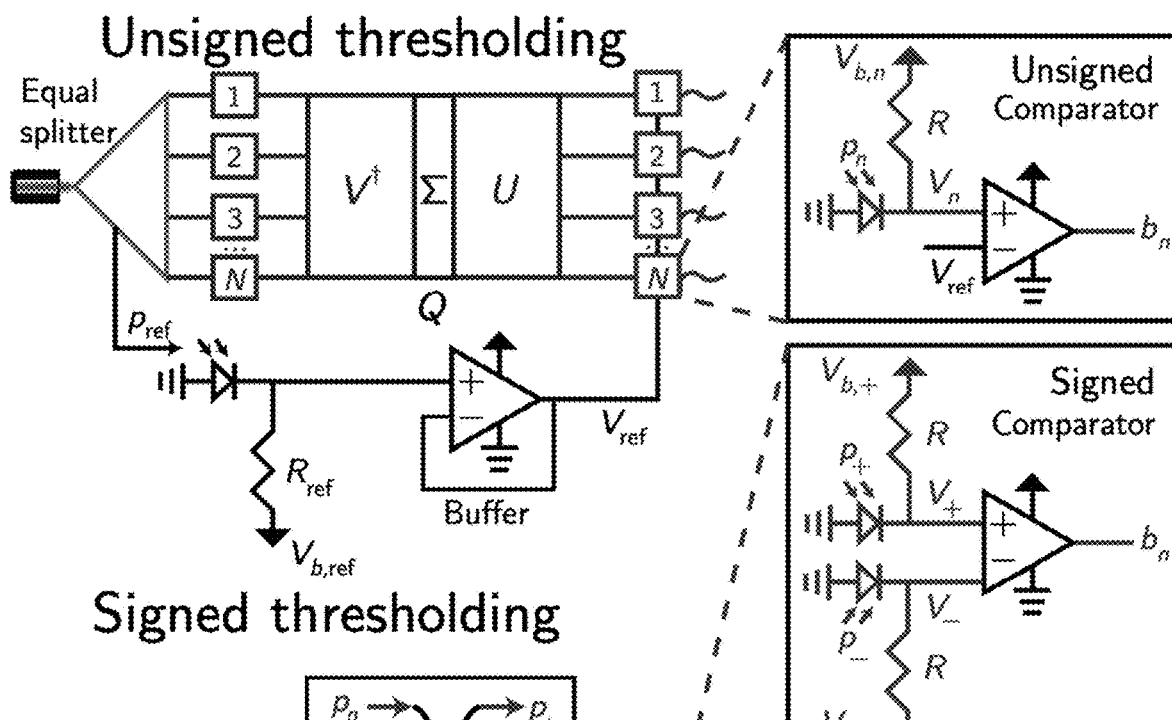
FIG. 5A is a schematic diagram of an unsigned thresholding design, according to an embodiment of the invention.
Figure 5B:
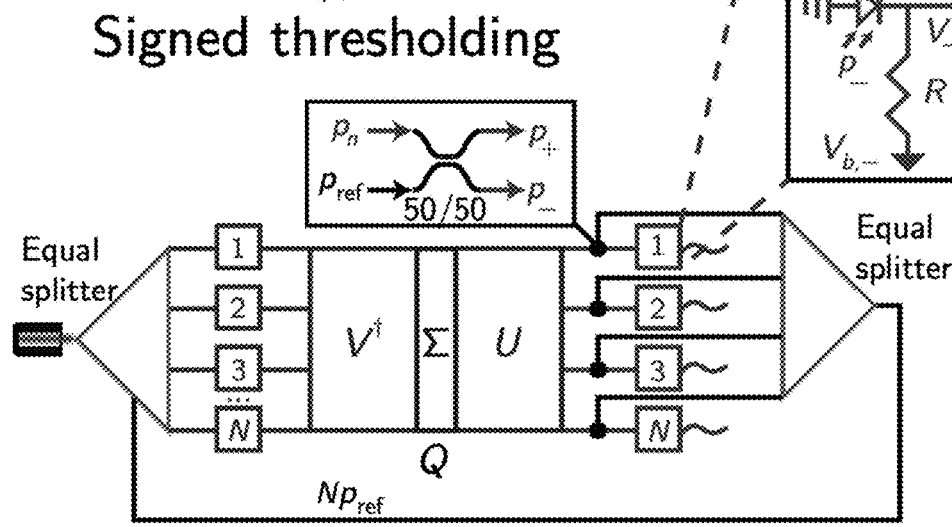
FIG. 5B is a schematic diagram of a signed thresholding design, according to an embodiment of the invention.
Figure 5C:
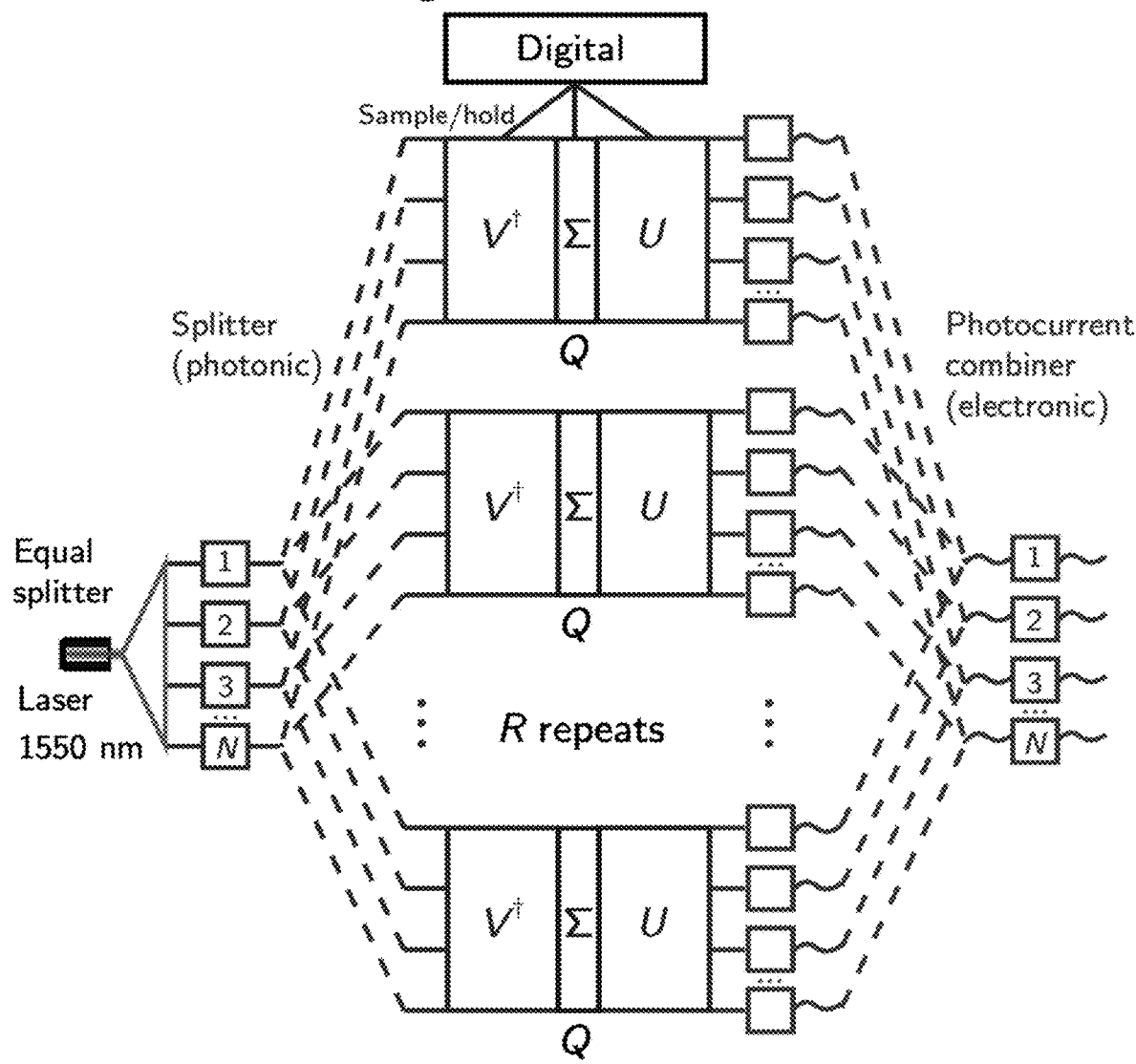
FIG. 5C is a schematic diagram showing a hardware-agnostic error correction SVD architecture, according to an embodiment of the invention.

FIG. 5A is a schematic diagram of an unsigned thresholding design which can compensate for laser drift and fluctuation by using light tapped from the input. FIG. 5B is a schematic diagram of a signed thresholding design which involves interfering a reference signal to measure the sign of the output signals. FIG. 5C is a schematic diagram showing a hardware-agnostic error correction SVD architecture which can operate using the same energy consumption.

Figure 6A:
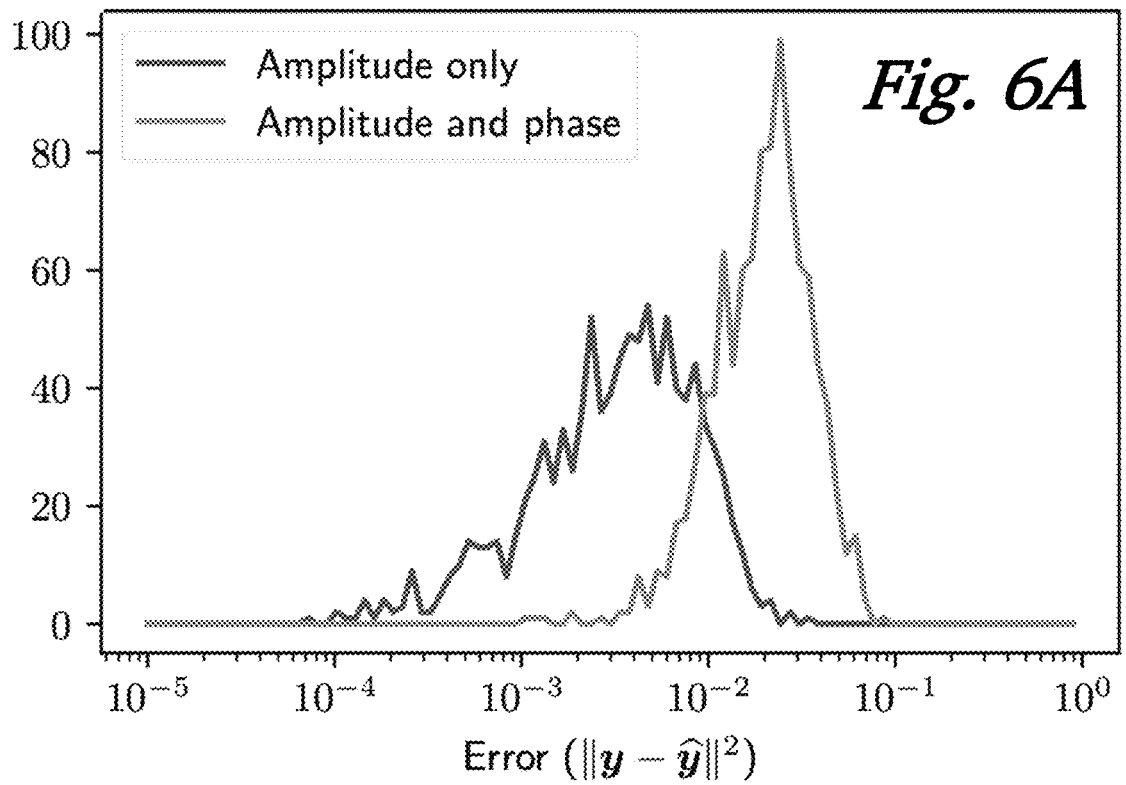
FIGS. 6A, 6B are graphs that compare the unitary and orthogonal matrix multiplication errors evaluated for 1000 Haar random matrix-vector pairs.
Figure 6B:
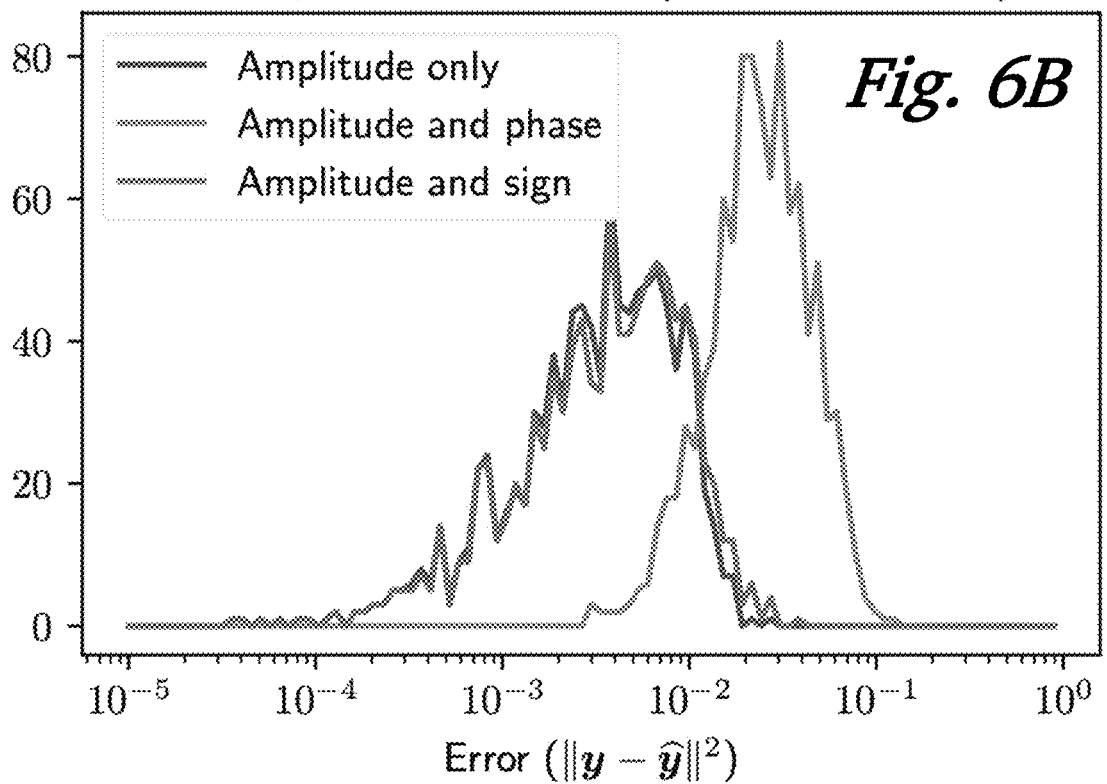
Figure 6C:
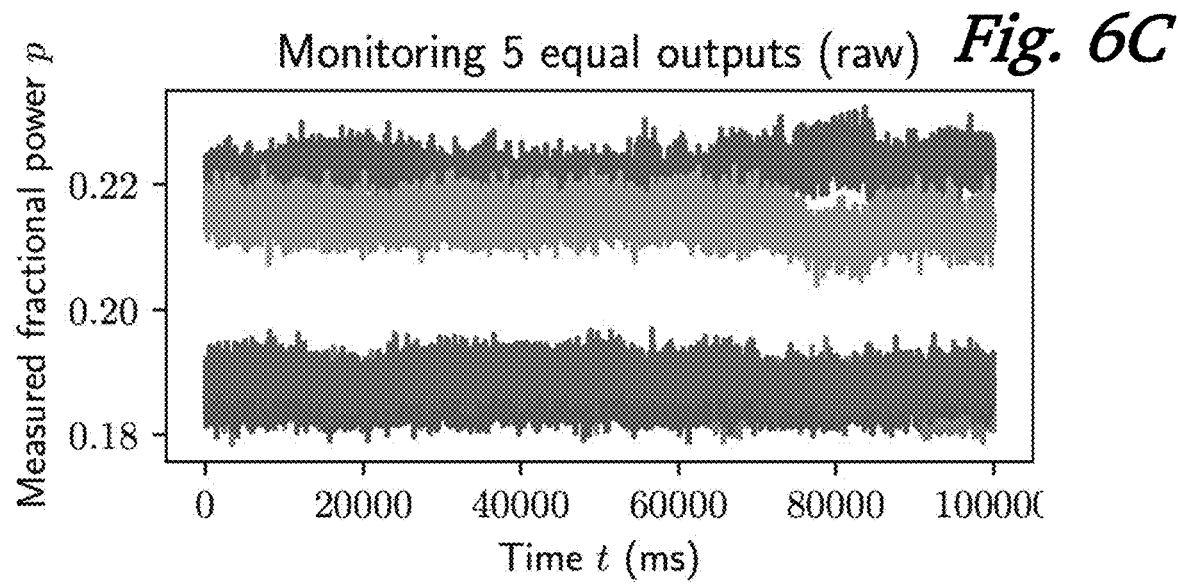
FIGS. 6C, 6D are graphs comparing biased systematic error and the standard deviation of the Gaussian distributions.
Figure 6D:
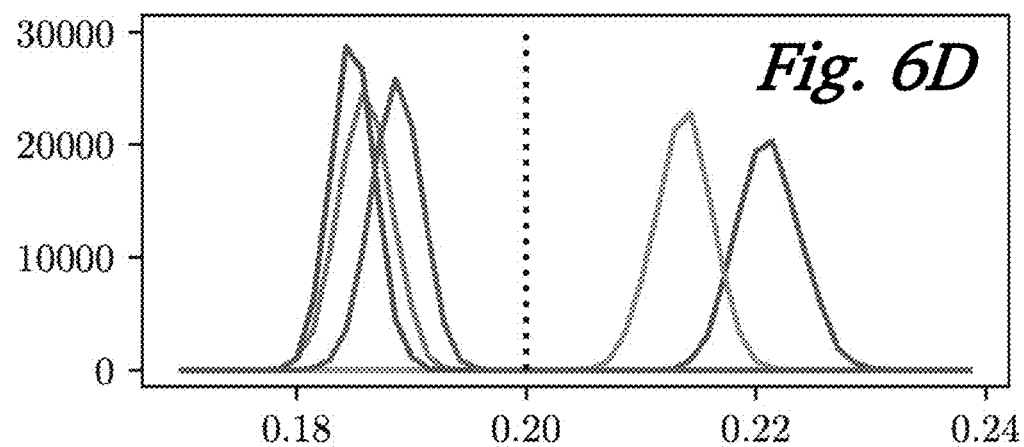
Figure 6E:
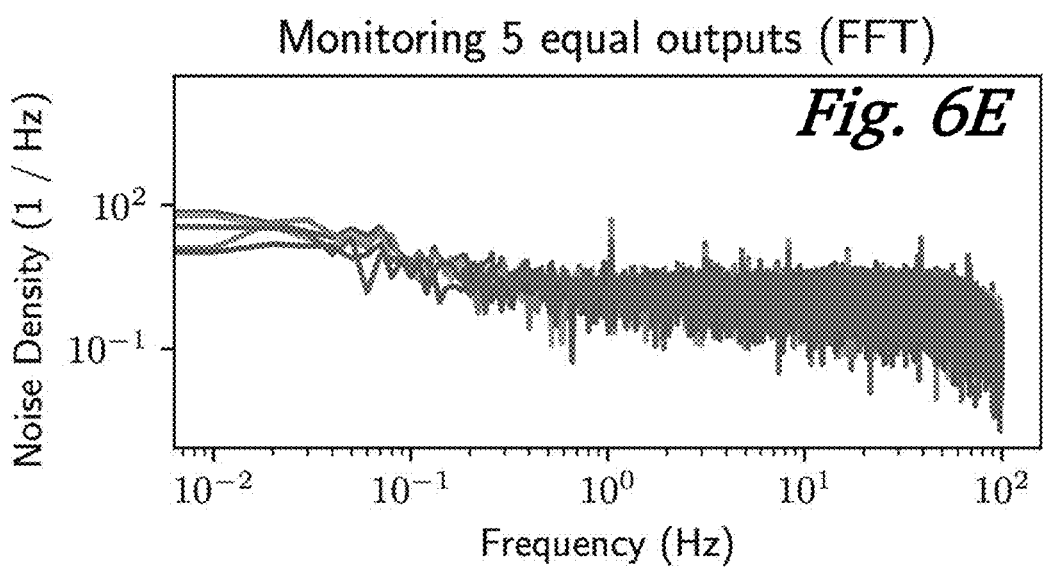
FIG. 6E is a graph showing the FFT spectrum of camera fractional spots.

FIGS. 6A, 6B are graphs that compare the unitary and orthogonal matrix multiplication errors evaluated for 1000 Haar random matrix-vector pairs. Specifically, we compare 1. amplitude only, 2. amplitude and phase, 3. amplitude and sign (for reals). We find that unitary and orthogonal matrices do not differ much import. FIGS. 6C, 6D are graphs showing how biased systematic error clearly dominates compared to the standard deviation of the Gaussian distributions, where the expected signal [0.2, 0.2, 0.2, 0.2, 0.2] shown using the dotted line. FIG. 6E is a graph showing the FFT of the camera fractional spots (used for all optical IO, normalized over the 5 output channels). This spectrum reveals classic 1/f noise (the slower variation in (c)) and white noise (broadband noise region) caused by camera photodetector noise with a noticeable dip at the end occurring at the frame rate of the camera (100 Hz).

Digital Conversion and Rescaling

An important aspect of the LightHash algorithm is the analog-digital interface implementing the thresholding, which consumes most of the energy in our platform. Here, we explain exactly how those interfaces might be implemented in a manner that avoids any laser fluctuation or drift error contributions since the reference itself also has the same fluctuation and drift.

First, note that singular values can only be represented as lossy elements in linear optical networks. Therefore, given $Q=U\Sigma V^\dagger$ with singular values in the diagonal E matrix represented as σ, we typically divide the singular values by $\sigma_{max}=\max(\sigma)$ such that no singular value exceeds 1. As a result, we need to "remember" this term when computing thresholds at the end of the circuit.

For the "unsigned" implementation of LightHash discussed in the main text and shown in FIG. 5A, no additional phase reference is required. However, we still need some way to cancel out the laser noise and drift, and the implementation of the thresholding requires some more care to various scaling factors in the hardware. For laser drift compensation, one can tap out a small fraction $\xi<1$ of the input power P to establish a reference power. The corresponding input vector x is renormalized to $\tilde{x}=\sqrt{(1-\xi)P}x/\sqrt{N}$. The actual photonic network performs the operation $\tilde{y}=QL\tilde{x}/\sigma_{max}$, where L is the photonic loss expressed as a fraction of the power (maximum of 1). This means that the actual output is $\tilde{y}=\sqrt{c_{out}}y$, where:

$$c_{out} = \frac{(1-\xi)PL}{\sigma_{max}^2 N} \quad (11)$$

$$c_{ref} = \xi P/N$$

where $c_{ref}$ is similar scaling factor for the reference signal split across N outputs. The split reference photocurrent is related to the threshold power by $I_{ref}=\eta c_{ref}$ and the output photo currents are given by $I_n=\eta\tilde{y}_n=\eta c_{out}|y|^2$ (Note that using the same bias voltages for all photodetectors ensures roughly same $\eta$, and additional attenuator MZIs may be used to correct for any sensitivity differences across photodetectors). Our scaling problem can therefore be reduced to finding a condition for $\xi$ such that $|y_n|^2=p_{th}$ and $I_{ref}=I_n$ simultaneously, i.e., $c_{out}=c_{ref}/p_{th}$, giving:

$$\xi = \left(1 + \frac{\sigma_{max}^2}{p_{th}L}\right)^{-1} \quad (12)$$

If $\xi>1$, an alternate type of rescaling may be done by setting $\xi=0.5$ and instead changing the bias voltages and thus the output photocurrents output by the integrated PDs to equalize the scaling:

$$\frac{\eta_{ref}}{\eta_{out}} = \frac{\sigma_{max}^2}{p_{th}L} \quad (13)$$

This rescaling calculation only needs to be performed once per block since L, $\sigma_{max}^2$ only depend on the implemented Q and not the inputs x.

For the "signed" implementation of LightHash shown in FIG. 5B, a circuit using a phase reference and comparator is required to measure whether the output of the mesh is a number that is positive or negative. The phase reference is generated by splitting the original input light into a reference path, which is in turn split into N waveguides. The phase reference is then interfered with the overall output of the photonic network given by y. In this manner we can treat the output signal r=i (a vector of all i's). Using a directional coupler to interfere any output y with incoming field i will give two outputs $p_+=|y+1|^2$ and $p_-=|y-1|^2$. The assignment of a bit is thus given by the simple condition $p_+>p_-$, which indicates whether a presumed real y is positive or negative. Note that the aforementioned laser noise and drift will affect r and y equally since they are sourced from the same laser, so the comparator will not be affected by this error source. However, other errors such as various systematic errors in the photonic circuit will still contribute the dominant portion of the error. Note that with this technique, there is no need for rescaling based on the maximum singular value and loss as is required in the unsigned implementation.

Another point to address is whether to use an analog digital converter (ADC) to output the final aggregated bits to allow for more bits per output. An analog-to-digital converter operates at low power using a successive approximation (SAR) approach and is actually built using stages of $2^b$ comparators, where b is the number of bits we use to represent the output. Compared to raw comparators, the additional overhead required for SAR might reduce the overall energy efficiency and increase latency in the overall computation per bit. This warrants future investigation because if the SAR overhead is designed to be negligible, an ADC could also be useful to aggregate bits and separate more peaks with minimal change in the hash error rate as we found using the scaling arguments in FIG. 2B.

Yet another alternative similar to an ADC would be to use "parallel multithresholding" where we split the output photonic signal into M waveguides. At the cost of additional photonic loss by a factor of M, this split signal could be compared to multiple thresholds set between the peaks. Alternatively, we could split the photocurrent equally using a $1\times2^b$ splitter to measure among $2^b$ thresholds spaced 2 apart, implementing using the unsigned thresholding comparator of FIG. 5A. Note that using multiple thresholds (effectively more than a single bit) will increase the error rate by a factor of at most $1/\rho(N,K)$, at most an order of magnitude increase.

Experimental Error Analysis

Chip errors in photonic meshes can be categorized as either random noise (polarization, photodetection, laser noise errors) or systematic error (loss, coupling, phase errors). Here, we address collective random and systematic error contributions in our experimental setup.

Random noise (especially that caused by shot noise) can be dealt with by increasing the input optical power, which implies a tradeoff and ultimately energy efficiency of operation (FIG. 2B, 2E). We aim to explore the various random errors in our experimental setup and the contribution of such errors to overall performance compared to systematic error.

As referenced in the main text, systematic error dominates random noise in our experimental system. This is because our random noise sources are generally straightforward to mitigate. For instance, as is shown in FIG. 5A, unsigned thresholding uses a laser reference signals to compensate for any laser drift. Signal to noise ratio can also generally be improved by using longer photodetector integration time, addressing error sources such as shot noise and 1/f noise caused by drift.

In our experimental setup, the photodetection noise is represented in terms of camera noise (effectively the photodetectors in our system). Camera noise consists of quantization noise in the camera pixels (14 bits of accuracy), camera photodetector shot noise, and noise due to vibration of the setup due to coupling to the mechanical stage. Other sources of noise include thermal fluctuations throughout the chip (which appears to dominate when phase shifts change) and polarization noise due to vibrations in the fiber. While not impossible to isolate these various sources of error, the systematic error in the photonic chip typically dominates these other error sources. As a consequence, we consolidate all of these errors into a single random error quantity to facilitate the comparison with systematic error. As an experimental demonstration, to confirm our claims we provide the evidence based on our results from FIG. 6C, 6D.

In addition to characterizing random error sources, we can perform an analog comparison of expected and measured device operations, specifically matrix-vector multiplications in the real and complex domain. To do this, we use our photonic mesh to compute the dot product of the measured vector and the predicted vector of the matrix multiply y=Ux over random U and random x.

For our characterization of systematic error, we compare real (orthogonal) and complex (unitary) matrix-vector multiplication errors performed on our chip. To select a random complex x, we sample from the complex normal distribution $\mathcal{N}(0, 0.5)+\mathcal{N}(0, 0.5)i$ and to select a random real x, we sample from $\mathcal{N}(0, 1)$ where $\mathcal{N}(\mu, \sigma)$ represents a normal distribution with mean $\mu$ and standard deviation $\sigma$. For the complex vector, we multiply by random complex matrix U sampled from the Haar measure of the unitary group. For the real vector, we multiply by random real matrix O sampled from the Haar measure of the orthogonal group.

The results of this analysis are shown in FIG. 6A, 6B, where we evaluate three types of errors: amplitude only ($\||y|-|\hat{y}|\|^2$), amplitude and phase ($\|y-\hat{y}\|^2$), and amplitude and sign ($\|y-\tilde{y}\|^2$), where $\tilde{y}=|\hat{y}|\cdot\text{sign}(\mathcal{R}(\hat{y}))$. A potential reason amplitude-and-phase measurements are so error-prone has to do with our readout method that relies on imperfect phase shifter calibration; this specifically affects the operation of the network for solving machine learning tasks. For amplitude and sign error to achieve the amplitude-only accuracy, we use the phase measurement to measure only the sign and not the phase itself and use the direct output power measurements to measure the output power to ultimately minimize the error. Note that all SVD calculations in this work assume that amplitude-only measurement is sufficient to represent error due to the U, V orthogonal matrix operations on inputs x, which is justified by FIG. 6B.

Algorithm 1 LightHash

```
1:  function LIGHTHASH(blk, S)
2:    Q ← blk.matrix
3:    D ← blk.difficulty
4:    for s ∈ [1, 2, . . . S] do              ▷ Prepare nonce
5:      nonceList[s] = blk.nonce + s
6:    end for
7:    N_inputs ← LENGTH(U)
8:    N_bits ← 256/N_inputs
9:    X, X̃ ← 0^(S×N)                         ▷ For batch matmul
10:   for s ∈ [0, 1, 2, . . . S] do
11:     X̃_s ← SHA3-256(blk,nonceList[s])     ▷ Digital
12:     X_s ← e^(iπX̃_s)/16                   ▷ On-chip
13:   end for
14:   Y ← QX                                  ▷ On-chip propagation
15:   P ← |Y|²                                ▷ Photodetection
16:   B ← P > p_th(N, K)                      ▷ Unsigned comparator
17:   for s ∈ [1, 2, . . . S] do              ▷ Access batch elements
18:     b ← SHA3-256(B_s ⊕ X̃_s)              ▷ Digital
19:     if INT(b) < 2^(256−D) then            ▷ First D bits are zero.
20:       return b
21:     end if
22:   end for
23:   return 0
24: end function
```

Algorithm 2 Optical Proof of Work

```
1:  function LHBLOCK(transactions, N, K, prevBlk)
2:    require N = 2^L ≤ 256 for L ∈ ℤ⁺ positive integer
3:    blk ← EMPTYBLOCK( )
4:    blk.height ← prevBlk.height + 1
5:    blk.difficulty ← LHDIFFICULTY(blk.height)
6:    blk.prevBlkPtr ← prevBlk.hash
7:    merkleTree ← MERKLETREE(transactions)
8:    blk.merkleRoot ← ROOTPOINTER(merkleTree)
9:    N_blocks ← 256/N
10:   Q ← 0^(256×256)                         ▷ Initialize Q to zeros
11:   n ← 0
12:   SEED(prevBlk.hash)                      ▷ For deterministic behavior.
13:   for m ∈ [1, 2, . . . N_blocks] do       ▷ Block diagonal Q
14:     for i ∈ [1, 2, . . . N] do
15:       for j ∈ [1, 2, . . . N] do
16:         n ← n + 1
17:         seed ← merkleRoot + n
18:         q ← PSEUDORAND([1, . . . K], seed)
19:         Q_{m,ij} ← 2q − K − 1              ▷ Block m, elem i, j.
20:       end for
21:     end for
22:   end for
23:   blk.matrix ← Q                          ▷ Do all chip calibration here.
24:   b_sol ← 0                               ▷ Solved hash
25:   while b_sol is 0 do:
26:     blk.nonce ← PSEUDORAND([0, 1, . . . 2^Nbits − 1]).
27:     b_sol ← LIGHTHASH(blk, 1)
28:   end while
29:   blk.hash ← b_sol
30:   return blk
31: end function
```

LightHash Pseudocode

In this section we describe the various algorithms of required to implement LightHash and optical proof of work defined in terms of pseudocode in Algs. 1 and 2. As mentioned in the main text, at a high level, the optical proof of work we propose is an improvement upon Bitcoin's current protocol which uses SHA256, which we have proposed as a Bitcoin Improvement Proposal. Note also our usage of the Keccak or SHA3-256 function (as opposed to other variants of SHA256) which has the following advantages: (1) it is a new-generation replacement of SHA2, developed under the NIST initiative and (2) it does not have adders and therefore results in a smaller area on chip, unlike SHA2.

There are two ways we can vary the LightHash implementation. First, we consider signed and unsigned thresholding as shown in FIGS. 5A-5C; we choose the unsigned variety discussed in the main text. The other parameter provided in the LightHash function of Alg. 1 is the batch size S which can be used by digital implementations to parallelize the matrix multiplication across many hashes at once.

The optical proof of work protocol shown in Alg. 2 considers the case S=1. Using wavelength multiplexing at the expense of higher error rates, this can be extended to larger S by encoding S bitvectors across S wavelengths propagating through the mesh simultaneously. Some preliminary analysis of the bit error dependence vs wavelength is shown in the main text in FIG. 3G though this may overestimate the error dispersion relation since the input vectors are also affected by the wavelength shift.

Finally, to demonstrate an implementation of LightHash, we have a bare-bones Python emulator implemented for LightHash in our Phox repository which is also explicitly tested in our data availability repository.

Although a photonic network of Mach-Zehnder interferometers has been discussed above as a preferred embodiment, the invention is not limited to this particular implementation. Another photonic matrix multiplier circuit may be used. For example, the photonic matrix multiplier circuit may be implemented using an optical neural network based on photoelectric multiplication or using an optical neural network based on wavelength multiplexing using approaches. Other optical matrix-vector multiplication architectures may also be used. For different matrix multiply implementations, most of the difference is in the operation of the photonic circuit, specifically the timing of input bit modulation and output bit detection. LightHash can work with various digitally verifiable photonic computing implementations of the matrix multiply.

The invention claimed is:

1. An apparatus for combined digital and optical processing of a cryptocurrency data block, the apparatus comprising:
 (a) a digital processor configured to perform a first hash computation to produce a hash vector from the cryptocurrency data block;
 (b) a laser and splitter configured to produce optical input signals;
 (c) optical modulators configured to binary phase-shift key modulate the optical input signals based on the hash vector to produce modulated optical input signals, wherein each of the modulated optical input signals is limited to a first set of discrete values;
 (d) a photonic matrix multiplier circuit configured to optically perform a discrete matrix-vector product operation on the modulated optical input signals to produce optical output signals, wherein the discrete matrix-vector product operation is defined by matrix elements, each of which is limited to a set of K discrete values, where $2 \leq K \leq 17$; wherein each of the optical output signals is limited to a second set of discrete values;
 (e) photodetectors and comparators configured to perform optoelectronic conversions of the optical output signals to produce corresponding digital electronic output signals;
 (f) wherein the digital processor is also configured to perform a second hash computation on an XOR result between the digital electronic output signals and the hash vector to produce a proof of work result.

2. The apparatus of claim 1 wherein each of the modulated optical input signals is limited to a set of two discrete values.

3. The apparatus of claim 1 wherein each of the optical output signals is limited to a set of 2K discrete values, where $2 \leq K \leq 17$.

4. The apparatus of claim 1 wherein the a discrete matrix-vector product operation has size N, and wherein the apparatus is configured to optically perform the discrete matrix-vector product operation 256/N times to produce the optical output signals, where $1 \leq N \leq 256$.

5. The apparatus of claim 1 wherein the photonic network implements a matrix $Q = U\Sigma V^\dagger$ with circuit size N using two unitary operators U, V of size N, and a set of N singular values $\Sigma$, implemented using Mach-Zehnder interferometer node attenuators, where $1 \leq N \leq 256$.

6. The apparatus of claim 1 wherein the photonic matrix multiplier circuit is a photonic network of Mach-Zehnder interferometers.

7. The apparatus of claim 1 wherein the first hash computation is a first SHA3-256 computation and the hash vector is a 256-bit vector; and wherein the second hash computation is a second SHA3-256 computation.

8. The apparatus of claim 1 further comprising R circuit copies of electronic and digital circuits as recited in claim 1, wherein the R circuit copies are configured to repeatedly perform the combined digital and optical processing of the cryptocurrency data block R times to reduce error.

* * * * *